(12) United States Patent
Young et al.

(10) Patent No.: US 11,759,042 B2
(45) Date of Patent: Sep. 19, 2023

(54) FOOD PREPARATION CONTROL SYSTEM

(71) Applicant: Breville USA, Inc., Torrance, CA (US)

(72) Inventors: Christopher Charles Young, Seattle, WA (US); Nelson Timothy Salazar, Seattle, WA (US); Emmett Barton, Seattle, WA (US); Michael Natkin, Seattle, WA (US); Douglas Eugene Baldwin, Arvada, CO (US)

(73) Assignee: Breville USA, Inc., Torrance, CA (US)

( * ) Notice: Subject to any disclaimer, the term of this patent is extended or adjusted under 35 U.S.C. 154(b) by 108 days.

(21) Appl. No.: 16/375,844

(22) Filed: Apr. 4, 2019

(65) Prior Publication Data

US 2019/0231113 A1    Aug. 1, 2019

Related U.S. Application Data

(63) Continuation of application No. 15/432,792, filed on Feb. 14, 2017, now abandoned, which is a
(Continued)

(51) Int. Cl.
*A47J 27/10* (2006.01)
*G05B 19/042* (2006.01)
*A47J 36/32* (2006.01)

(52) U.S. Cl.
CPC ............. *A47J 27/10* (2013.01); *A47J 36/321* (2018.08); *G05B 19/042* (2013.01); *G05B 19/0426* (2013.01); *G05B 2219/2643* (2013.01)

(58) Field of Classification Search
CPC ....... A47J 27/10; A47J 36/321; G05B 19/042; G05B 19/0426; G05B 2219/2643
See application file for complete search history.

(56) References Cited

U.S. PATENT DOCUMENTS

| | | | | |
|---|---|---|---|---|
| 4,309,584 A | * | 1/1982 | Terakami | H05B 6/6435 219/492 |
| 4,390,766 A | | 6/1983 | Horinouchi | |

(Continued)

FOREIGN PATENT DOCUMENTS

| | | |
|---|---|---|
| CN | 101883512 A | 11/2010 |
| CN | 102247093 A | 11/2011 |

(Continued)

OTHER PUBLICATIONS

Baldwin et al., "Food Preparation Guidance System", U.S. Appl. No. 14/974,635, filed Dec. 18, 2015, 61 pages.
(Continued)

*Primary Examiner* — Steven N Leff

(57) ABSTRACT

Systems, methods, and articles to provide customized control of a cooking appliance, such as a sous vide cooker. A user provides a selection of one or more ending characteristics for a food product. A processor-based device determines one or more output food preparation parameters based on the user's selection of the one or more ending characteristics. Measurements of temperature, power delivery, or other characteristics may be obtained during cooking process. A cooking program controlling the cooking process may be revised or updated based at least in part on the obtained measurements or analysis of the measurements. Estimations or projections about the cooking process may be presented to a user via a user interface of the cooking appliance or a user interface of one or more computing devices (e.g., smartphone, tablet computer) associated with the user.

25 Claims, 13 Drawing Sheets

Related U.S. Application Data continuation of application No. 15/214,056, filed on Jul. 19, 2016, now abandoned.

(60) Provisional application No. 62/195,199, filed on Jul. 21, 2015.

(56) References Cited

U.S. PATENT DOCUMENTS

| | | | |
|---|---|---|---|
| 4,807,169 | A | 2/1989 | Overbeck |
| 5,096,725 | A | 3/1992 | Kim |
| 5,183,984 | A | 2/1993 | Nakagawa |
| 5,352,874 | A | 10/1994 | Gong |
| 5,750,960 | A | 5/1998 | Bresolin |
| 5,877,477 | A | 3/1999 | Petty et al. |
| 6,486,453 | B1 | 11/2002 | Bales et al. |
| 6,539,842 | B1 | 4/2003 | Chapman et al. |
| 6,568,848 | B1 | 5/2003 | Chapman et al. |
| 6,712,505 | B2 | 3/2004 | Chapman et al. |
| 6,759,637 | B2 | 7/2004 | Kim |
| 6,789,067 | B1 | 9/2004 | Liebenow |
| 6,811,308 | B2 | 11/2004 | Chapman et al. |
| 6,933,483 | B2 | 8/2005 | Chun |
| 7,102,107 | B1 | 9/2006 | Chapman |
| 7,141,258 | B2 * | 11/2006 | Hillmann .............. F24C 7/082 426/233 |
| 7,372,368 | B2 | 5/2008 | Chapman et al. |
| 7,605,349 | B2 | 10/2009 | Gaynor et al. |
| 7,685,256 | B2 | 3/2010 | Kudo et al. |
| 7,722,248 | B1 | 5/2010 | Chapman et al. |
| 8,240,914 | B1 | 8/2012 | Chapman et al. |
| 8,323,026 | B2 | 12/2012 | Do et al. |
| 8,342,847 | B2 | 1/2013 | Do et al. |
| 8,419,434 | B2 | 4/2013 | Do et al. |
| 8,455,028 | B2 | 6/2013 | Breunig et al. |
| 9,159,094 | B2 * | 10/2015 | Hurst .................... G06Q 50/12 |
| 10,194,770 | B2 | 2/2019 | Young et al. |
| 10,692,394 | B2 * | 6/2020 | Young .................... G09B 5/065 |
| 2003/0037681 | A1 | 2/2003 | Zhu et al. |
| 2004/0107178 | A1 | 6/2004 | Kudo et al. |
| 2004/0149736 | A1 * | 8/2004 | Clothier ................ H05B 6/062 219/627 |
| 2004/0267382 | A1 | 12/2004 | Cunningham et al. |
| 2005/0193901 | A1 | 9/2005 | Buehler |
| 2006/0136078 | A1 | 6/2006 | Chen |
| 2006/0213904 | A1 * | 9/2006 | Kates .................... B65D 79/02 374/E3.004 |
| 2007/0158335 | A1 | 7/2007 | Mansbery |
| 2008/0136785 | A1 | 6/2008 | Baudisch et al. |
| 2008/0140862 | A1 | 6/2008 | Elston et al. |
| 2008/0222553 | A1 | 9/2008 | Benjamin-Lambert |
| 2009/0029326 | A1 | 1/2009 | Kark et al. |
| 2009/0236335 | A1 | 9/2009 | Ben-Shmuel et al. |
| 2009/0258331 | A1 * | 10/2009 | Do ........................ G09B 21/003 434/127 |
| 2010/0147823 | A1 | 6/2010 | Anderson et al. |
| 2010/0199854 | A1 | 8/2010 | Homme et al. |
| 2010/0292998 | A1 | 11/2010 | Bodlaender et al. |
| 2010/0313768 | A1 | 12/2010 | Koether et al. |
| 2011/0087987 | A1 * | 4/2011 | Brown .................... F24C 7/082 715/771 |
| 2011/0185915 | A1 | 8/2011 | Eades et al. |
| 2012/0032524 | A1 | 2/2012 | Baarman et al. |
| 2013/0092145 | A1 | 4/2013 | Murphy et al. |
| 2013/0125763 | A1 | 5/2013 | Valance |
| 2013/0171304 | A1 * | 7/2013 | Huntley ................ G06Q 50/00 426/231 |
| 2013/0220143 | A1 * | 8/2013 | Fetterman ............ A47J 36/321 99/330 |
| 2013/0306627 | A1 | 11/2013 | Libman et al. |
| 2014/0292536 | A1 | 10/2014 | Barth et al. |
| 2014/0295822 | A1 | 10/2014 | Koo et al. |
| 2014/0314921 | A1 | 10/2014 | Kuempel et al. |
| 2015/0194041 | A1 * | 7/2015 | Allen .................... A47J 36/321 340/584 |
| 2015/0212661 | A1 | 7/2015 | Robberechts et al. |
| 2015/0257574 | A1 | 9/2015 | Hoare et al. |
| 2015/0290795 | A1 | 10/2015 | Oleynik |
| 2015/0294225 | A1 | 10/2015 | Takei et al. |
| 2015/0312964 | A1 | 10/2015 | Sorenson et al. |
| 2016/0005327 | A1 | 1/2016 | Young et al. |
| 2016/0073451 | A1 | 3/2016 | Reischmann et al. |
| 2016/0100717 | A1 | 4/2016 | Zhu |
| 2016/0174748 | A1 | 6/2016 | Baldwin et al. |
| 2016/0220064 | A1 | 8/2016 | Young et al. |
| 2017/0020324 | A1 | 1/2017 | Young et al. |
| 2017/0139385 | A1 | 5/2017 | Young et al. |
| 2017/0162073 | A1 | 6/2017 | Young et al. |

FOREIGN PATENT DOCUMENTS

| | | | |
|---|---|---|---|
| CN | 104898613 A | 9/2015 | |
| EP | 1406184 A1 | 4/2004 | |
| EP | 2292981 A2 | 3/2011 | |
| EP | 2 767 159 B1 | 11/2015 | |
| JP | 2001-349551 A | 12/2001 | |
| JP | 2002-63178 A | 2/2002 | |
| JP | 2002063178 A | 2/2002 | |
| JP | 2003-50907 A | 2/2003 | |
| JP | 2003050907 A | 2/2003 | |
| JP | 2004-220414 A | 8/2004 | |
| JP | 3602400 B2 | 12/2004 | |
| JP | 2005-030623 A | 2/2005 | |
| JP | 2005-245981 A | 9/2005 | |
| JP | 2007-024487 A | 2/2007 | |
| JP | 4288208 B2 | 7/2009 | |
| KR | 1990-0012053 A | 8/1990 | |
| KR | 10-2008-0089947 A | 10/2008 | |
| KR | 10-2011-0080988 A | 7/2011 | |
| KR | 10-2012-0029027 A | 3/2012 | |
| KR | 10-2014-0051153 A | 4/2014 | |
| KR | 10-2014-0103798 A | 8/2014 | |
| WO | 2007/051049 A2 | 5/2007 | |
| WO | 2012/092641 A1 | 7/2012 | |
| WO | WO-2014019018 A1 * | 2/2014 | .............. A47J 27/10 |
| WO | 2015/075730 A2 | 5/2015 | |
| WO | 2017/015270 A1 | 1/2017 | |

OTHER PUBLICATIONS

Baldwin, Douglas. "DouglasBaldwin.com expert in sous vide cooking and nonlinear waves," <http://douglasbaldwin.com/sous-vide.html>, 2008, 40 pages.

European Patent Office, Extended European Search Report, EP Patent Application 16866918.2, dated Feb. 28, 2019, 10 pages.

Final Office Action dated Aug. 28, 2017 for U.S. Appl. No. 14/789,414 for Young, C. et al., filed Jul. 1, 2015.

Final Office Action dated Aug. 28, 2017 for U.S. Appl. No. 15/432,790 for Young, C. et al., filed Feb. 14, 2017.

International Search Report and Written Opinion, dated Jan. 25, 2017, for International Application No. PCT/US2016/057205, 16 pages.

International Search Report and Written Opinion, dated Jan. 31, 2017, for International Application No. PCT/US2016/061886, 9 pages.

International Search Report, dated Apr. 6, 2016, for International Application No. PCT/US2015/066697, 6 pages.

International Search Report, dated May 12, 2016, for International Application No. PCT/US2016/015388, 5 pages.

International Search Report, dated Oct. 27, 2016, for International Application No. PCT/US2016/042924, 5 pages.

International Search Report, dated Sep. 23, 2015, for International Application No. PCT/US2015/038858, 3 pages.

Japan Patent Office, Translation of Notice of Reasons for Refusal, JP Patent Application 2018-502757, dated Jun. 15, 2020, 7 pages.

Kasper, Lynne Rosetta. "There's more than one way to cook an egg. Dave Arnold has 11," retrieved from URL https://web.archive.org/web/20130416002008/https://www.splendidtable.org/story/theres-morethan-one-way-to-cook-an-egg-dave-arnold-has-11 on Sep. 5, 2018; Wayback machine date of Apr. 16, 2013. 4 pages.

(56) References Cited

OTHER PUBLICATIONS

Non-Final Office Action dated Apr. 28, 2017 for U.S. Appl. No. 14/789,414 for Young, C. et al., filed Jul. 1, 2015.
Non-Final Office Action dated May 1, 2017 for U.S. Appl. No. 15/432,790 for Young, C. et al., filed Feb. 14, 2017.
U.S. Appl. No. 62/021,530, filed Jul. 7, 2014.
U.S. Appl. No. 62/095,669, filed Dec. 22, 2014.
U.S. Appl. No. 62/110,228, filed Jan. 30, 2015.
U.S. Appl. No. 62/195,199, filed Jul. 21, 2015.
Written Opinion of the International Searching Authority, dated Apr. 6, 2016, for International Application No. PCT/US2015/066697, 11 pages.
Written Opinion of the International Searching Authority, dated May 12, 2016, for International Application No. PCT/US2016/015388, 4 pages.
Written Opinion of the International Searching Authority, dated Oct. 27, 2016, for International Application No. PCT/US2016/042924, 12 pages.
Written Opinion of the International Searching Authority, dated Sep. 23, 2015, for International Application No. PCT/US2015/038858, 11 pages.
Young et al., "Data Aggregation and Personalization for Remotely Controlled Cooking Devices," U.S. Appl. No. 15/351,091, filed Nov. 14, 2016, 85 pages.
Young et al., "Food Preparation Control System", U.S. Appl. No. 15/214,056, filed Jul. 19, 2016, 95 pages.
Young et al., "Food Preparation Control System", U.S. Appl. No. 15/009,525, filed Jan. 28, 2016, 72 pages.
Young et al., "Systems, Articles and Methods Related to Providing Customized Cooking Instruction", U.S. Appl. No. 14/789,414, filed Jul. 1, 2015.
Young et al., "Systems, Articles and Methods Related to Providing Customized Cooking Instruction", U.S. Appl. No. 15/432,790, filed Feb. 14, 2017.
Chinese Office Action, dated Aug. 3, 2021, for Chinese Application No. 201680054960.3, 18 pages.

* cited by examiner

FOOD PREPARATION CONTROL SYSTEM

CROSS REFERENCE TO RELATED APPLICATIONS

This application is a continuation of U.S. patent application Ser. No. 15/432,792, filed on Feb. 14, 2017, and entitled "FOOD PREPARATION CONTROL SYSTEM;" which is a continuation of U.S. patent application Ser. No. 15/214,056, filed on Jul. 19, 2016, and entitled "FOOD PREPARATION CONTROL SYSTEM;" which claims the benefit of U.S. Provisional Patent Application Ser. No. 62/195,199, filed on Jul. 21, 2015, and entitled "FOOD PREPARATION CONTROL SYSTEM;" the disclosures of which are hereby incorporated herein in their entireties by reference.

TECHNICAL FIELD

The present disclosure generally relates to food preparation, and in particular relates to providing food preparation control useful, for example, in sous vide cooking appliances.

DESCRIPTION OF THE RELATED ART

Cooking is the art of preparing food for consumption with the use of heat. There are numerous methods of cooking, most of which have been known for many years. These methods include baking, roasting, frying, grilling, barbecuing, smoking, boiling, steaming and braising, to name a few. Various methods use differing levels of heat and moisture and vary in cooking time. The particular method chosen normally affects the result because some foods are more appropriate to some methods than others are.

Cooking recipes are a set of instructions that describes how to prepare or make a food product. Recipes may generally include various information about a food product such as the required ingredients to prepare the food product along with the quantities and proportions of each of the ingredients, the necessary equipment, an ordered list of steps and techniques, one or more cooking times, one or more cooking temperatures, etc.

When cooking some food products, such as eggs, meat and vegetables, variations in the cooking time and cooking temperature can have significant effects on the resulting texture and taste. As people's tastes vary, different people have diverse preferences regarding the texture, taste, or other properties of cooked food products. Often it is difficult for a person cooking a food product to know precisely how to cook the food product to achieve a desired result, such as a desired texture, consistency, or doneness, for the food product.

BRIEF SUMMARY

A method of operation in a processor-based food preparation guidance system may be summarized as including: receiving, via a user computing device, a request for preparation guidance for a food product; responsive to the received request, causing at least one of a first set of at least two graphical prompts to be displayed by the user computing device, each of the graphical prompts in the first set of at least two graphical prompts depicting a respective gradation of at least one first characteristic of the food product, the respective gradations being different from one another; receiving, via the user computing device, a selection related to at least one of the gradations of the at least one first characteristic of the food product; responsive to the received selection, causing, by at least one processor, a cooking program to be generated, the cooking program including at least one of instructions or data usable by a cooking appliance to perform a cooking process for the food product; and controlling, by the at least one processor, a cooking appliance to perform the cooking process which cooks the food product according to the cooking program.

The method of operation in a processor-based food preparation guidance system may further include: causing at least two food product selection prompts to be displayed by the user computing device, each of the at least two food product selection prompts associated with a different food product; and receiving, via the user computing device, a selection of one of the at least two food products selection prompts.

The method of operation in a processor-based food preparation guidance system may further include, responsive to receiving the selection of one of the at least two food products selection prompts, causing at least one instructional image or instructional video associated with the selected food product to be displayed by the user computing device.

The method of operation in a processor-based food preparation guidance system may further include causing a notification to be displayed by the user computing device, the notification instructs a user to place the food product in a food receiving portion of the cooking appliance.

The method of operation in a processor-based food preparation guidance system may further include causing a notification to be displayed by the user computing device, the notification instructs a user to remove the food product from a food receiving portion of the cooking appliance.

The method of operation in a processor-based food preparation guidance system may further include causing at least one food preparation parameter to be displayed by the user computing device.

Causing at least one food preparation parameter to be displayed by the user computing device may include causing at least one of a temperature, a projected cooking time, or a projected cooking completion time to be displayed by the user computing device. Receiving a selection related to at least one of the gradations of the at least one first characteristic of the food product may include receiving a selection of a temperature which relates to at least one of the gradations of the at least one first characteristic of the food product. Receiving a selection related to at least one of the gradations of the at least one first characteristic of the food product may include receiving a selection of a temperature which is between a first temperature associated with a first gradation and a second temperature associated with a second gradation, the second gradation adjacent the first gradation with respect to a temperature scale.

The method of operation in a processor-based food preparation guidance system may further include: receiving, via the user computing device, a selection of a desired cooking completion time indicative of a time by which a user desires the food product to be fully cooked; and causing a first notification to be displayed by the user computing device based at least in part on the received selection of the desired cooking completion time, the first notification instructs a user to turn on the cooking appliance.

The method of operation in a processor-based food preparation guidance system may further include: causing a second notification to be displayed by the user computing device based at least in part on the received selection of the desired cooking completion time, the second notification instructs a user to place the food product in a food receiving portion of the cooking appliance.

Causing at least one of a first set of at least two graphical prompts to be displayed by the user computing device may include causing at least one of a first set of at least two graphical prompts to be displayed by the user computing device, each of the graphical prompts in the first set of at least two graphical prompts depicting respective different textures, consistencies, or doneness for the food product. Receiving a selection of one of the gradations of the at least one first characteristic of the food product may include receiving, via a user computing device, a selection of one of the gradations by a processor-based food preparation guidance system over a data network, and causing a cooking program to be generated comprises causing a cooking program to be generated by the food preparation guidance system. Causing at least one of a first set of at least two graphical prompts to be displayed by the user computing device may include causing at least one of a first set of images or videos to be displayed by the user computing device. Causing at least one of a first set of at least two graphical prompts to be displayed by the user computing device may include causing at least one of a first set of images or videos to be displayed by the user computing device, the first set of images or videos depicting a user interaction with the food product. Causing at least one of a first set of images or videos to be displayed by the user computing device may include causing at least one of a first set of images or videos to be displayed by the user computing device, the first set of images or videos depicting at least one of: cutting the food product, breaking the food product into one or more pieces, stirring the food product, pouring the food product, or manipulating the food product. Causing a cooking program to be generated may include causing a cooking program to be generated at the food preparation guidance system, and the method of operation in a processor-based food preparation guidance system may further include: sending the generated cooking program from the food preparation guidance system to the cooking appliance over a data channel. Sending the generated cooking program from the food preparation guidance system to the cooking appliance may include sending the generated cooking program from the food preparation guidance system to the cooking appliance over the data channel via a user computing device coupled to each of the food preparation guidance system and the cooking appliance.

The method of operation in a processor-based food preparation guidance system may further include: obtaining, by the at least one processor, at least one parameter measurement indicative of a characteristic of the cooking process during the controlling of the cooking appliance; and determining, by the at least one processor, at least one of an update to the cooking program or a cooking projection parameter relating to the cooking process based at least in part on the obtained at least one parameter measurement.

Obtaining at least one parameter measurement indicative of a characteristic of the cooking process may include obtaining a temperature measurement of a fluid bath of the cooking appliance and obtaining a measurement of an amount of heat transferred to the fluid bath. Obtaining at least one parameter measurement indicative of a characteristic of the cooking process may include obtaining a plurality of temporally spaced parameter measurements. Obtaining at least one parameter measurement indicative of a characteristic of the cooking process may include obtaining a plurality of temporally spaced temperature measurements and a plurality of corresponding temporally spaced measurements of an amount of heat transferred to a fluid bath. Obtaining at least one parameter measurement indicative of a characteristic of the cooking process may include obtaining a measurement indicative of at least one of temperature of a fluid bath of the cooking appliance or power delivered by the cooking appliance. Obtaining at least one parameter measurement indicative of a characteristic of the cooking process may include obtaining a temperature measurement from a temperature sensor of at least one of a surface of the food product or an interior of the food product. Obtaining a temperature measurement from a temperature sensor may include obtaining a temperature measurement from at least one of a resistive temperature detector, a thermocouple, a thermistor, a positive temperature coefficient element or a blackbody/infrared emissions detector. Obtaining at least one parameter measurement indicative of a characteristic of the cooking process may include obtaining a measurement indicative of power from at least one of a voltage sensor, a current sensor, a resistance sensor, a magnetic field sensor, a Hall effect sensor, or a giant magnetoresistance sensor. Determining at least one of an update to the cooking program or a cooking projection parameter relating to the cooking process may include determining an estimated time until the food product reaches a specific condition.

The method of operation in a processor-based food preparation guidance system may further include causing the at least one of an update to the cooking program or a cooking projection parameter relating to the cooking process to be presented by a user computing device.

Causing the at least one of an update to the cooking program or a cooking projection parameter relating to the cooking process to be presented by a user computing device may include sending data to the user computing device over a data channel. Causing a cooking program to be generated may include causing a cooking program to be generated that includes at least one of instructions or data usable by a cooking appliance to perform a cooking process for the food product, the cooking appliance including an immersion circulator. Receiving a request for preparation of a food product may include receiving, by the at least one processor, a request for preparation of a food product from a remotely located client computing device. Causing a cooking program to be generated may include causing the determination of at least one of a cooking temperature or a cooking time for the food product.

The method of operation in a processor-based food preparation guidance system may further include: subsequent to receiving the request for preparation of the food product, causing at least one supplemental prompt to be presented by a user computing device; receiving, via the user computing device, a response to the at least one supplemental prompt; and determining at least one food preparation parameter for the cooking program based at least in part on the received response to the supplemental prompt.

Causing at least one supplemental prompt to be presented by the user computing device may include causing at least one supplemental prompt to be presented by the user computing device, the at least one supplemental prompt relating to at least one of a physical characteristic of the food product, an environmental condition, or a food preparation condition. Causing at least one supplemental prompt to be presented by the user computing device may include causing at least one supplemental prompt to be presented by the user computing device, the at least one supplemental prompt relating to at least one of a size of the food product, a shape of the food product, a class of the food product, a temperature of the food product, an altitude, a geographic location, or a cooking method.

A processor-based food preparation guidance system may be summarized as including: at least one processor; and at least one nontransitory processor-readable medium, communicatively coupled to the at least one processor and which stores at least one of processor-executable instructions or data, wherein in use the at least one processor may: receive a request for preparation guidance for a food product from a user computing device; responsive to the received request, cause at least one of a first set of at least two graphical prompts to be displayed by the user computing device, each of the graphical prompts in the first set of at least two graphical prompts depicting a respective gradation of at least one first characteristic of the food product, the respective gradations being different from one another; receive a selection related to at least one of the gradations of the at least one first characteristic of the food product; responsive to the received selection, cause a cooking program to be generated, the cooking program including at least one of instructions or data usable by a cooking appliance to perform a cooking process for the food product; and control a cooking appliance to perform the cooking process which cooks the food product according to the cooking program.

The at least one processor may: cause at least two food product selection prompts to be displayed by the user computing device, each of the at least two food product selection prompts associated with a different food product; and receive a selection of one of the at least two food products selection prompts. The at least one processor may, responsive to receiving the selection of one of the at least two food products selection prompts, cause at least one instructional image or instructional video associated with the selected food product to be displayed by the user computing device. The at least one processor may cause a notification to be displayed by the user computing device, the notification instructs a user to place the food product in a food receiving portion of the cooking appliance. The at least one processor may cause a notification to be displayed by the user computing device, the notification instructs a user to remove the food product from a food receiving portion of the cooking appliance. The at least one processor may cause at least one food preparation parameter to be displayed by the user computing device. The at least one processor may cause at least one of a temperature, a projected cooking time, or a projected cooking completion time to be displayed by the user computing device. The at least one processor may receive a selection of a temperature which relates to at least one of the gradations of the at least one first characteristic of the food product. The at least one processor may receive a selection of a temperature which is between a first temperature associated with a first gradation and a second temperature associated with a second gradation, the second gradation adjacent the first gradation with respect to a temperature scale. The at least one processor may: receive a selection of a desired cooking completion time indicative of a time by which a user desires the food product to be fully cooked; and cause a first notification to be displayed by the user computing device based at least in part on the received selection of the desired cooking completion time, the first notification instructs a user to turn on the cooking appliance. The at least one processor may cause a second notification to be displayed by the user computing device based at least in part on the received selection of the desired cooking completion time, the second notification instructs a user to place the food product in a food receiving portion of the cooking appliance. The at least one processor may cause at least one of a first set of at least two graphical prompts to be displayed by the user computing device, each of the graphical prompts in the first set of at least two graphical prompts depicting respective different textures, consistencies, or doneness for the food product. The at least one processor may receive a selection of one of the gradations by a processor-based food preparation guidance system over a data network, and causing a cooking program to be generated may include causing a cooking program to be generated by the food preparation guidance system. The at least one processor may cause at least one of a first set of images or videos to be displayed by the user computing device. The at least one processor may cause at least one of a first set of images or videos to be displayed by the user computing device, the first set of images or videos depicting a user interaction with the food product. The at least one processor may cause at least one of a first set of images or videos to be displayed by the user computing device, the first set of images or videos depicting at least one of: cutting the food product, breaking the food product into one or more pieces, stirring the food product, pouring the food product, or manipulating the food product. The at least one processor may: cause a cooking program to be generated at the food preparation guidance system; and send the generated cooking program from the food preparation guidance system to the cooking appliance over a data channel. The at least one processor may send the generated cooking program from the food preparation guidance system to the cooking appliance over the data channel via a user computing device coupled to each of the food preparation guidance system and the cooking appliance. The at least one processor may: obtain at least one parameter measurement indicative of a characteristic of the cooking process during control of the cooking appliance; and determine at least one of an update to the cooking program or a cooking projection parameter relating to the cooking process based at least in part on the obtained at least one parameter measurement. The at least one processor may obtain a temperature measurement of a fluid bath of the cooking appliance and may obtain a measurement of an amount of heat transferred to the fluid bath. The at least one processor may obtain a plurality of temporally spaced parameter measurements. The at least one processor may obtain a plurality of temporally spaced temperature measurements and a plurality of corresponding temporally spaced measurements of an amount of heat transferred to a fluid bath. The at least one processor may obtain a measurement indicative of at least one of temperature of a fluid bath of the cooking appliance or power delivered by the cooking appliance. The at least one processor may obtain a temperature measurement from a temperature sensor of at least one of a surface of the food product or an interior of the food product. The at least one processor may obtain a temperature measurement from at least one of a resistive temperature detector, a thermocouple, a thermistor, a positive temperature coefficient element or a blackbody/infrared emissions detector. The at least one processor may obtain a measurement indicative of power from at least one of a voltage sensor, a current sensor, a resistance sensor, a magnetic field sensor, a Hall effect sensor, or a giant magnetoresistance sensor. The at least one processor may determine an estimated time until the food product reaches a specific condition. The at least one processor may cause the at least one of an update to the cooking program or a cooking projection parameter relating to the cooking process to be presented by a user computing device. The at least one processor may send data to the user computing device over a data channel. The at least one processor may cause a cooking program to be generated that includes at least one of instructions or data usable by a cooking appliance to perform a cooking process for the food product, the cooking appliance including an immersion circulator. The at least one processor may receive a request for preparation of a food product from a remotely located client computing device. The at least one processor may cause the determination of at least one of a cooking temperature or a cooking time for the food product. The at least one processor may: subsequent to receipt of the request for preparation of the food product, cause at least one supplemental prompt to be presented by a user computing device; receive a response to the at least one supplemental prompt; and determine at least one food preparation parameter for the cooking program based at least in part on the received response to the supplemental prompt. The at least one processor may cause at least one supplemental prompt to be presented by the user computing device, the at least one supplemental prompt relating to at least one of a physical characteristic of the food product, an environmental condition, or a food preparation condition. The at least one processor may cause at least one supplemental prompt to be presented by the user computing device, the at least one supplemental prompt relating to at least one of a size of the food product, a shape of the food product, a class of the food product, a temperature of the food product, an altitude, a geographic location, or a cooking method.

A method of operation in a processor-based food preparation guidance system may be summarized as including: causing, by at least one processor, a cooking program to be generated, the cooking program including at least one of instructions or data usable by a cooking appliance to perform a cooking process for a food product; controlling, by the at least one processor, the cooking appliance to perform the cooking process which cooks the food product according to the cooking program; from time-to-time, receiving, by the at least one processor, state information data from the cooking appliance; and sending, by the at least one processor, the received state information data to a plurality of user computing devices over at least one data communications channel.

The method of operation in a processor-based food preparation guidance system may further include: receiving, by the at least one processor, a modification to the cooking program from at least one of the plurality of user computing devices over the at least one data communications channel; responsive to receiving the modification to the cooking program, modifying the generated cooking program; and controlling, by the at least one processor, the cooking appliance to perform the cooking process for the food product according to the modified cooking program.

The method of operation in a processor-based food preparation guidance system may further include, responsive to receiving the modification to the cooking program from at least one of the plurality of user computing devices, sending, by the at least one processor, data indicative of the modification to the plurality of user computing devices over the at least one data communications channel.

Receiving a modification to the cooking program from at least one of the plurality of user computing devices over at least one data communications channel may include receiving a modification to the cooking program from a first user computing device indirectly via a second user computing device. Receiving a modification to the cooking program from at least one of the plurality of user computing devices over at least one data communications channel may include receiving a modification to the cooking program from at least one of the plurality of user computing devices over at least a first data communications channel and a second data communications channel, the first data communications channel different from the second data communications channel.

The method of operation in a processor-based food preparation guidance system may further include: receiving, by the at least one processor, location information from at least one of the plurality of user computing devices over the at least one data communications channel; and logically associating, by the at least one processor, the received location information with a physical location of the cooking appliance in a nontransitory processor-readable medium.

Sending the received state information data to a plurality of user computing devices over at least one data communications channel may include sending the received state information data to a first user computing device indirectly via a second user computing device. Sending the received state information data to a plurality of user computing devices over at least one data communications channel may include sending the received state information data to at least one of the plurality of user computing devices over at least a first data communications channel of a first type and a second data communications channel of a second type, the first type different from the second type.

The method of operation in a processor-based food preparation guidance system may further include: receiving, by the at least one processor, a modification to the cooking program from at least one of the plurality of user computing devices over the at least one data communications channel; responsive to receiving the modification to the cooking program, sending, by the at least one processor, data indicative of the modification to the plurality of user computing devices over the at least one data communications channel; subsequent to the sending of the data indicative of the modification to the plurality of user computing devices, modifying the generated cooking program; and controlling, by the at least one processor, the cooking appliance to perform the cooking process for the food product according to the modified cooking program.

The method of operation in a processor-based food preparation guidance system may further include, subsequent to the controlling of the cooking appliance to perform the cooking process for the food product according to the modified cooking program, sending, by the at least one processor, updated state information data to the plurality of user computing devices over the at least one data communications channel.

A processor-based food preparation guidance system may be summarized as including: at least one processor; and at least one nontransitory processor-readable medium, communicatively coupled to the at least one processor and which stores at least one of processor-executable instructions or data, wherein in use the at least one processor: causes a cooking program to be generated, the cooking program including at least one of instructions or data usable by a cooking appliance to perform a cooking process for a food product; controls the cooking appliance to perform the cooking process which cooks the food product according to the cooking program; from time-to-time, receives state information data from the cooking appliance; and sends the received state information data to a plurality of user computing devices over at least one data communications channel.

The at least one processor may: receive a modification to the cooking program from at least one of the plurality of user computing devices over the at least one data communications channel; responsive to receiving the modification to the cooking program, modify the generated cooking program;

and control the cooking appliance to perform the cooking process for the food product according to the modified cooking program. The at least one processor may, responsive to receiving the modification to the cooking program from at least one of the plurality of user computing devices, send data indicative of the modification to the plurality of user computing devices over the at least one data communications channel. The at least one processor may receive a modification to the cooking program from a first user computing device indirectly via a second user computing device. The at least one processor may receive a modification to the cooking program from at least one of the plurality of user computing devices over at least a first data communications channel and a second data communications channel, the first data communications channel different from the second data communications channel. The at least one processor may: receive location information from at least one of the plurality of user computing devices over the at least one data communications channel; and logically associate the received location information with a physical location of the cooking appliance in a nontransitory processor-readable medium. The at least one processor may send the received state information data to a first user computing device indirectly via a second user computing device. The at least one processor may send the received state information data to at least one of the plurality of user computing devices over at least a first data communications channel of a first type and a second data communications channel of a second type, the first type different from the second type. The at least one processor may: receive a modification to the cooking program from at least one of the plurality of user computing devices over the at least one data communications channel; responsive to receipt of the modification to the cooking program, send data indicative of the modification to the plurality of user computing devices over the at least one data communications channel; subsequent to the sending of the data indicative of the modification to the plurality of user computing devices, modify the generated cooking program; and control the cooking appliance to perform the cooking process for the food product according to the modified cooking program. The at least one processor may, subsequent to the control of the cooking appliance to perform the cooking process for the food product according to the modified cooking program, send updated state information data to the plurality of user computing devices over the at least one data communications channel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with communications devices (e.g., smartphones, personal computers, tablet computers, personal digital assistants), server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the implementations.

Implementations of the present disclosure are directed to systems and methods for providing customized food preparation instruction, guidance and/or control. Initially, with reference to FIGS. 1-4, 5A and 5B, environment for such systems and methods are discussed. Then, with reference to FIGS. 6-15, systems and methods for controlling a cooking appliance are discussed.

Food Preparation Guidance System

Figure 1:
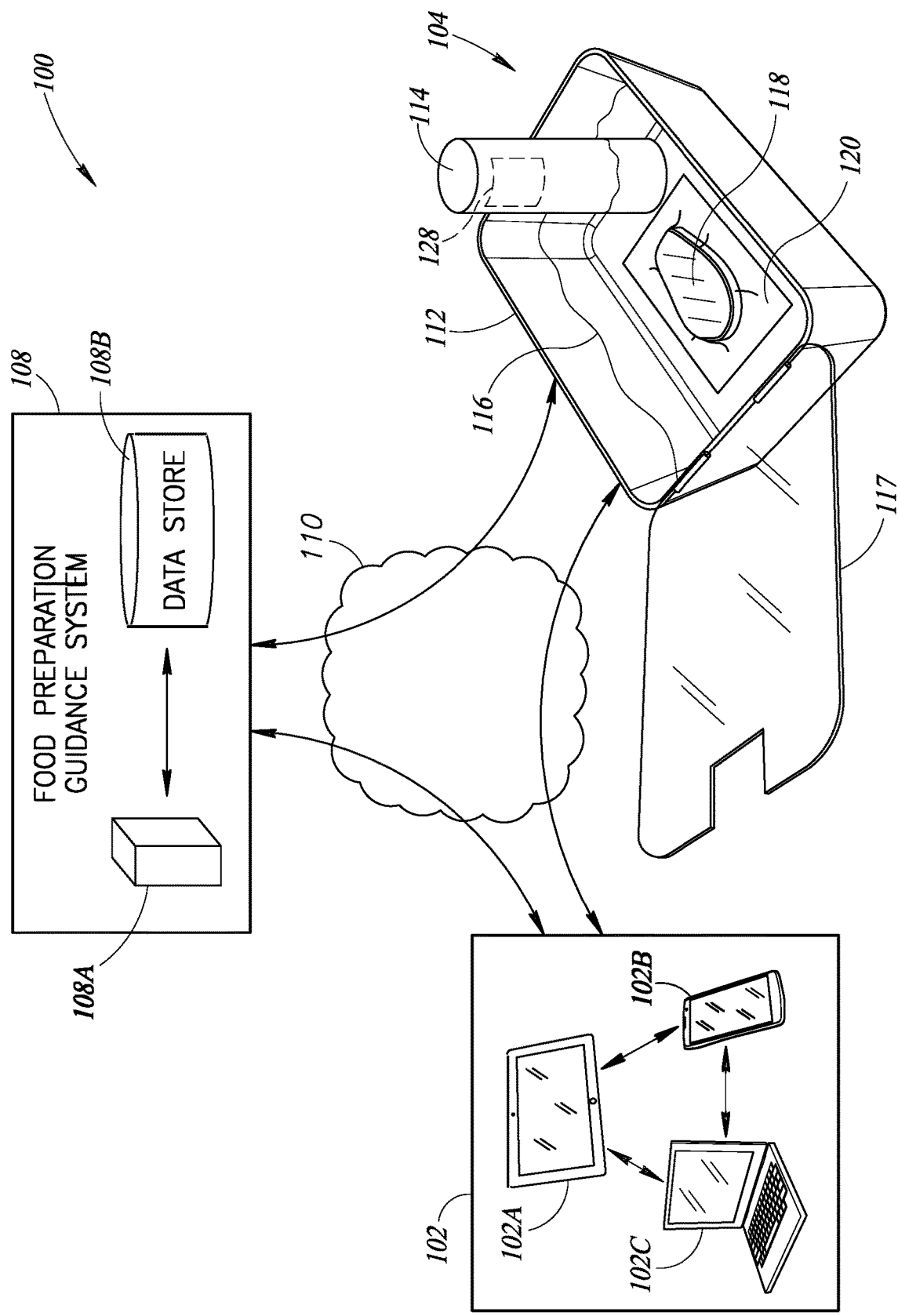
FIG. 1 is a schematic view of an environment in which a food preparation guidance system may be implemented, according to at least one illustrated implementation.

FIG. 1 shows a networked environment 100 for use in providing customized food preparation instruction, guidance and/or control. As illustrated in FIG. 1, the networked environment 100 may include a plurality of user computing devices 102 (e.g., tablet computer 102A, smartphone 102B, laptop computer 102C, wearable computing device (e.g., watch)), a cooking appliance 104 and a food preparation guidance (FPG) system 108 communicatively coupled together via one or more communications channels, for instance communications networks 110 (e.g., LAN, WAN, Internet, Worldwide Web, cellular network, USB®, Bluetooth®, Bluetooth® Low Energy, Wi-Fi®, NFC).

In the illustrated implementation, the cooking appliance 104 takes the form of a sous vide cooker that includes a vessel or container 112 and a thermal immersion circulator 114 coupled to, for instance, an edge of the container. In some implementations, the cooking appliance 104 may be other types of cooking appliances, such as an oven (convection and/or conventional), induction cooker, etc. The container 112 holds a quantity (e.g., 10 liters) of liquid 116 (e.g., water) that may be heated and circulated using the thermal immersion circulator 114. In addition to liquid, other fluids (e.g., air, oil) may alternatively or additionally be used. Further, in some implementations the container 112 may be insulated and/or may have a selectively removable cover or lid 117. In the illustrated example, a food product 118 is placed inside a vacuum-sealed plastic bag or pouch 120 which is immersed in the liquid bath 116. In some implementations, the food product 118 may be placed inside of a resealable plastic bag or jar, or in any other suitable container. The food product 118 may be any of a number of different types of food products, such as meats, eggs or vegetables. Some food products, such as eggs, may be placed directly in the liquid bath 116 without use of the plastic bag 120 or other container. Further, in instances where the cooking appliance utilizes a non-liquid fluid (e.g., air), the food product may be placed inside the vessel or cooking chamber without use of a container that separates the food product from the fluid.

Figure 2:
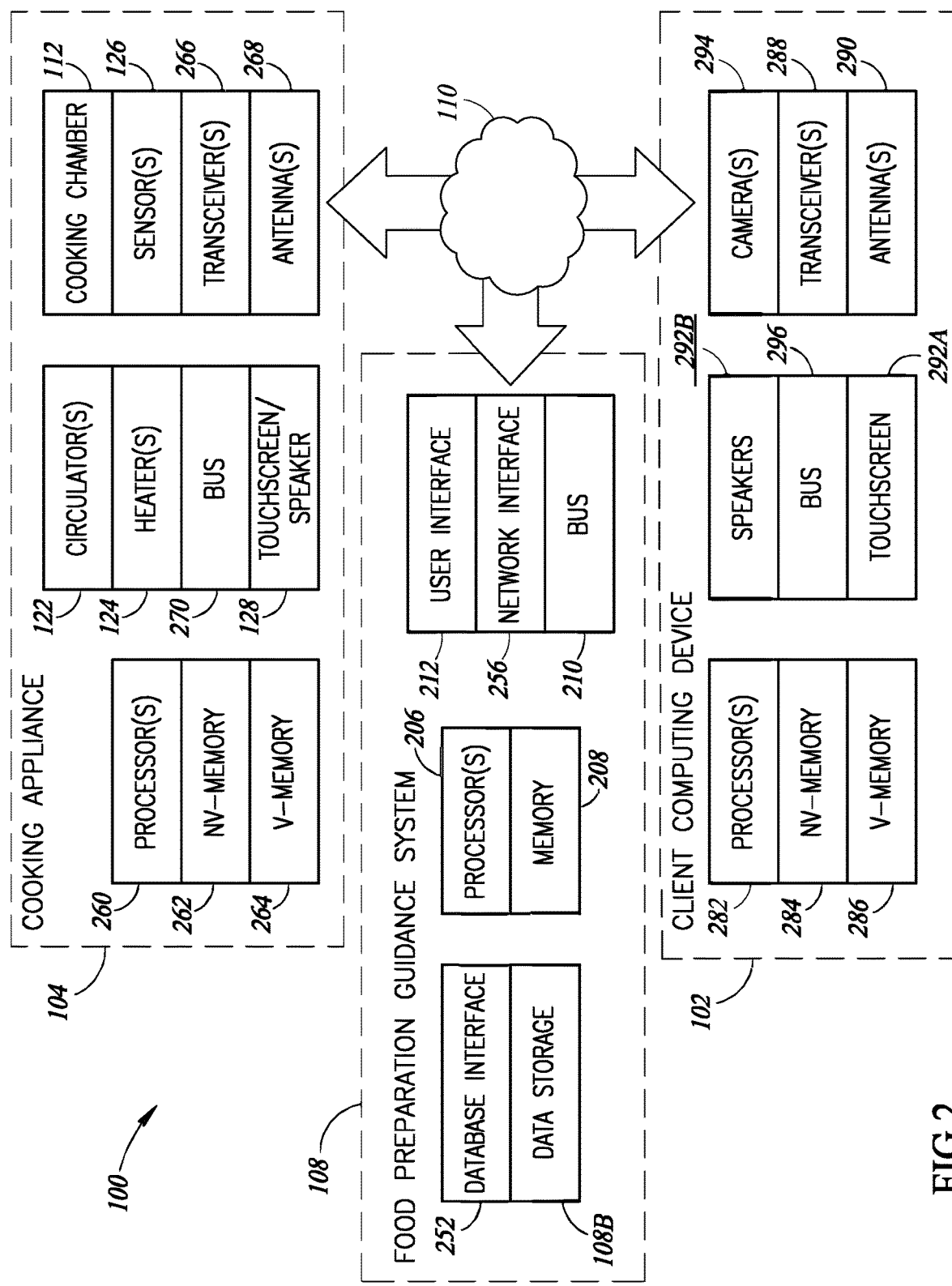
FIG. 2 is a functional block diagram of the food preparation guidance system of FIG. 1, according to at least one illustrated implementation.

The thermal immersion circulator 114 may be an electrically powered device that circulates and heats the liquid bath 116 at an accurate and stable temperature. The thermal immersion circulator 114 may include a circulator pump 122 (FIG. 2) to move the liquid in the liquid bath 116 and a heating element 124 (FIG. 2) immersed in the liquid to heat the liquid. The thermal immersion circulator 114 may also include a probe or sensor 126 (FIG. 2), for example, a temperature sensor to sense the temperature of the liquid bath 116 and control circuitry which compares the temperature measured by the temperature probe with a desired temperature value and supplies power to the heating element as required to control the temperature of the liquid bath. Various components of the cooking appliance 104 are shown in FIG. 2. The control circuitry may control the temperature of the liquid bath 116 so that the food product 118 may be cooked according to particular cooking instructions or a determined cooking program. For example, in the case where the food product 118 is a one-inch thick rib-eye steak, the control circuitry may be programmed to heat the liquid bath 116 to a temperature of 60° C., whereas the control circuitry may be programmed to heat the liquid bath to a temperature of 85° C. to cook root vegetables.

The thermal immersion circulator 114 may optionally include a user interface 128 that includes one or more inputs (e.g., buttons, touch screen, microphone) and one or more outputs (e.g., screen, LED(s), speaker(s)). The user may interact with the user interface 128 to select one or more cooking programs, select one or more temperature settings or select one or more cooking durations. As discussed below, in some implementations the user interface 128 may provide information to the user relating to the current status or estimated future status for a cooking process. In some implementations, the thermal immersion circulator 114 may not include a user interface and the user may interact with a user interface integrated into the cooking appliance 104 or an interface of another device (e.g., one or more user computing devices 102 communicatively coupled to the circulator 114).

In some implementations, the control circuitry may utilize a proportional-integral-derivative (PID) control scheme to accurately control the temperature of the liquid bath 116 according to a determined cooking program or process. A PID controller calculates an error value as the difference between a measured temperature and a desired set point. The PID controller attempts to minimize the error by adjusting the temperature through use of the controllable heating element 124. Generally, the PID controller algorithm involves three separate constant parameters (e.g., "P", "I", "D"). These parameters may be interpreted in terms of time: P depends on the present temperature error, I depends on the accumulation of past temperature errors, and D is an estimation of future temperature errors based on current rate of change. The weighted sum of these three actions may be used to adjust the temperature control for the cooking process via controlling the power supplied to the controllable heating element 124. In some implementations, other control algorithms may be used, such as PI control, PD control, P control, I control or other linear or nonlinear control schemes.

In some implementations, a user may utilize one or more of the client computing devices 102 to interact with the cooking appliance 104. For example, the client computing devices 102 may execute a program or "app" that provides at least one of instructions or data to the cooking appliance 104 and receives information from the cooking appliance via one or more suitable communications interfaces (e.g., Bluetooth®, Bluetooth® Low Energy, USB®, Wi-Fi®). In some implementations, the client computing devices 102, the cooking appliance 104 and/or the FPG system 108 may communicate via more than one communication interface (e.g., Bluetooth®, Bluetooth® Low Energy, and/or Wi-Fi®), and may utilize one of the communication interfaces if another communication interface fails or is otherwise unavailable or unreliable. For example, the cooking appliance 104 may first communicate with the computing device 102 via a Bluetooth® Low Energy interface. Then, upon determining that the Bluetooth® Low Energy interface is unreliable or unavailable, the cooking appliance 104 may communicate with the computing device 102 vie a Wi-Fi® interface. Such redundant use of communication interfaces provides additional reliability and flexibility of communication between the various devices of the system.

In some implementations, multiple user computing devices 102 may use short-range connections (e.g., Bluetooth® Low Energy) to form a mesh network for relaying control and state information to more distant devices. For example, if the laptop computer 102C is positioned so that it can communicate directly with the smartphone 102B but cannot communicate directly with the circulator 114, data may be transferred between the circulator and the laptop computer indirectly via the smartphone.

Additionally, as discussed in further detail below, a user may utilize the client computing device 102 to experience (e.g., view, listen) one or more audio/image/video ("media") depictions of a prepared food product. The one or more media depictions may present audio or visual depictions of the prepared food product at various gradations or variants of an ending characteristic, such as texture, taste-sensation, consistency or doneness. The media depictions allow the user to simply select a preferred gradation for one or more characteristics of a cooked food product, such as the texture, consistency, color, or any other still or moving visual indication of a desired result for a food product (e.g., egg yolk, egg white, steak) based on visual image, pictorial or video representations of the food product at a variety of different gradations.

The user may utilize the client computing devices 102 to send one or more input parameters such as ending preferences or starting conditions to the food preparation guidance (FPG) system 108 via one or more communications channels such as the communications networks 110. In response, the FPG system 108 may send output food preparation parameters, output cooking parameters (e.g., time, temperature, pressure, speed, etc.), and/or an arbitrarily complex cooking program to the cooking appliance 104 over communications networks 110 to autonomously control the cooking appliance. The FPG system 108 may communicate directly with the cooking appliance 104 via the communications networks 110 or may communicate with the cooking appliance indirectly via the client computing devices 102. In some implementations, the user may view the output cooking parameters or program on a display of one or more of the client computing devices 102 or the cooking appliance 104. The cooking appliance 104 may then prepare the food product 118 according to the received food preparation parameters or program. Although the term "cooking" is used herein, it should be appreciated that the present implementations may also be applied to food preparation that does not necessarily require heat, such as preparing a puree, ice cream, smoothie, dough, or other food products.

The FPG system 108 may take the form of one or more server computer systems 108A with associated nontransitory processor-readable storage media or data store 108B. While illustrated as a single server computer system 108A and associated nontransitory storage media 108B, many implementations may employ two or more server computer system 108A and/or nontransitory associated processor- or computer-readable storage media 108B. In some implementations or instances, the nontransitory processor- or computer-readable media 108B may include a database or other data structure which stores one or more of: image data, video data, audio data, cooking simulation models, lookup tables, food preparation algorithms, customer identifiers, customer account identifiers, customer identity information, financial account information (e.g., credit and/or debit account numbers, expiration dates, security codes), customer cooking history, data captured during cooking processes, and/or other data or statistics.

While generally described below in terms of a user interface generated via instructions executing on a computing device, in some implementations the FPG system 108 may serve as a user portal that may operate, for example, as a Web server, serving HTML pages or providing Web services which function as the user interface. Thus, in some implementations, the FPG system 108 serves as a user portal, providing a user interface, for instance a Web based interface, which allows users access functionality disclosed herein via various processor-based computing devices 102.

A user interface displayed on the display of the computing devices 102 may include various pull-down menus, tabs, user selectable icons, input fields, scroll bars, images, videos, audio, and dialog boxes, as well as other user interface components. The user interface may allow a user or customer to create a user or customer account using the computing devices 102. The user or customer may enter their full name, screen name or nickname, address, and/or date of birth. The user or customer may optionally enter financial account information, for instance an account number, expiration date, and validation or security code associated with a charge or debit account. This allows automated charging or debiting on purchase of items, goods or services by the user or customer.

The various systems, subsystems, and/or processor-based devices are capable of communications, for example, via the one or more networks 110 which may be, for instance, packet switched communications networks, such as the Internet, Worldwide Web portion of the Internet, extranets, intranets, and/or various other types of telecommunications networks such as cellular phone and data networks or channels, and plain old telephone system (POTS) networks. The type of communications infrastructure should not be considered limiting. The communications networks 110 may take any of a large variety of forms, and may include modems (e.g., DSL modem, cable modem), routers, network switches, and/or bridges, etc.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

While FIG. 1 illustrates a representative networked environment 100, typical networked environments may include many additional computer systems and entities. The concepts taught herein may be employed in a similar fashion with more populated networked environments than that illustrated in FIG. 1. For example, there are likely hundreds, if not thousands or even millions of users or customers, computing devices 102 and cooking appliances 104. There may be more than one FPG system 108, for example, located in different countries or regions within a country. Further, some or all of the FPG system 108 may be implemented within the computing devices 102 and/or the cooking appliance 104.

In implementations where the cooking appliance 104 implements sous vide cooking, the cooking appliance may measure the temperature of the liquid bath 116 and measure or estimate the amount of heat transferred to the liquid. For implementations where the cooking appliance 104 is of another type, the cooking appliance may measure the surface temperature of the food product 118 using a suitable sensor and measure or estimate the amount of heat that is absorbed by the food product. In some implementations, the cooking appliance 104 measures the surface temperature of the food product 118 and measures one or more interior temperatures of the food product.

The cooking appliance 104 collects and stores some or all of the aforementioned data at fixed or variable time intervals. This collection of data forms a collection of time-series data that may be processed to provide updates to a cooking program and/or to provide cooking projections presentable to a user through a user interface, such as a display of one or more of the client computing devices 102 or a display of the cooking appliance 104.

As discussed above, the client computing devices 102 may communicate with the FPG system 108 and the cooking appliance 104 via the communication networks 110. The client computing devices 102 may allow a user to select an end result for the food product 118 which the user is cooking via the user interface. For example, the user may select an image displayed on a display of the user interface of one or more of the client computing devices 102 that corresponds to a desired doneness of meat. As another example, the user may select a video that depicts a desired texture for a custard.

The client computing devices 102 may also allow the user to provide information indicating what food product(s) the user plans to prepare. For example, the user may provide or select a recipe for a food product from a plurality of recipes for one or more food products. The amount of detail provided by the user may alter how the food product is prepared by the cooking appliance 104. For example, simply indicating a food product as a steak may generate a different cooking program than indicating a food product is four prime-grade, two centimeters thick, top-loin steaks that weigh 1.3 kilograms.

As an example, the user may input any or all of the following relating to a food product to be prepared: the species and/or muscles of cuts of meat, fish or poultry; one or more ingredients in the plastic pouch (e.g., fats, flavorful liquids), the initial temperature of the food product; the volume or mass of the food product; the surface area of the food product; geographic origin or source of the food product (e.g., New Zealand, XYZ farm); or how the raw food product was prepared (e.g., brined, dry-aged, marinated, cured, blended, ground, molded). For example, if the user specifies that a steak is grass-fed beef from New Zealand, the system may recognize that such has a lower fat content, and may adjust a cooking program accordingly. The user may also input the shape of the food product, such as its characteristic length or width, or a description of the food product (e.g., "slab-like," "large egg"). In some implementations, the user may input or select one or more photographs or videos of the food product which may be usable by the client computing device 102, FPG system 108, and/or cooking appliance 104 to generate a cooking program for preparing the food product 118.

In some implementations, the user may select a recipe that provides information usable by the client computing device 102, the FPG system 108, and/or cooking appliance 104 to generate a cooking program for preparing the food product 118. For example, the user may select a recipe on a Web site which automatically provides details to the computing device 102, the FPG system 108, and/or cooking appliance 104 about the food product to be prepared upon selection of the recipe. In some implementations, the user may be able to modify the selected recipe to suit the user's particular preferences.

The cooking appliance 104 may transmit various data or information to the client computing devices 102 and/or to the FPG system 108. For example, the cooking appliance 104 may from time-to-time transmit a subset or all of the collected time-series measurement data to the client computing devices 102 or to the FPG system 108. In some implementations, the cooking appliance 104 may transmit only a subset of the collected time-series data that includes the most recent measurement or the measurements obtained since the previous successful transmission of the measurement data to the client computing devices 102.

The cooking appliance 104 may also transmit information about the present state of the cooking appliance and/or one or more previous states of the cooking appliance. Such information may include whether the cooking appliance 104 is powered on or in a standby mode, current and previous set-point temperatures, or any manually adjusted parameters of the cooking appliance, such as a manually selectable temperature set-point. The cooking appliance 104 may also transmit information about non-standard operating conditions, such as power interruptions or a low liquid level for the liquid bath 116. The cooking appliance 104 may also transmit system parameters, such as control parameter settings, firmware version, memory usage, sample rate, etc. The cooking appliance 104 may also transmit information or data received from the FPG system 108 to the client computing devices 102, or vice versa.

The client computing devices 102 may transmit various data or information to the cooking appliance 104 and/or to the FPG system 108. For example, the client computing devices 102 may transmit a cooking program to the cooking appliance 104 or new firmware to the cooking appliance.

A cooking program may include, for example, a program type, a program start time (e.g., immediately or at a determined future time), and a recipe or dish title (e.g., eggs, steak). The cooking program may also specify a set-point temperature for the liquid bath 116 (e.g., 60° C., 75° C.) of a sous vide cooker. The cooking program may also specify a cooking duration, which may begin after a starting event. The starting event may be a time when the cooking program is received by the cooking appliance 104 or when the liquid bath 116 has been heated to a determined temperature (e.g., a set-point temperature). The starting event may also be when the cooking appliance 104 senses that the food product 118 has been inserted therein or when the user indicates the food product has been inserted into the cooking appliance 104. The starting event may also occur at a determined time or after a determined delay after one or more events.

The cooking program may also indicate whether the liquid bath 116 should be pre-heated prior to insertion of the food product 118 into the liquid bath. For example, the cooking program may specify that the liquid bath 116 should be heated to at least 40° C. before the food product is placed in the liquid bath. As another example, the cooking program may indicate that the food product 118 should be placed in the liquid bath 116 without pre-heating the liquid bath.

In some implementations, the cooking program may include parameters used to implement an accelerated cooking program. For example, an accelerated cooking program may cause the liquid bath 116 to be heated to a first temperature above a set-point temperature for a period of time, and then the temperature of the liquid bath may be reduced to a second temperature at or near the set-point temperature for the remainder of the cooking period. As discussed more below, the cooking program may utilize a characteristic of the food product (e.g., mass) or one or more measurements (e.g., temperature, power) to determine how much additional power is needed to heat the food product 118, and use full power delivery until that amount of power has been delivered.

The cooking program may also indicate whether the cooking appliance 104 should use the time-series data to determine or forecast near equilibrium conditions for the food product 118 indicative of completion of a cooking process.

In some implementations, the cooking program may indicate the amount of time the food product 118 should be held at the set-point temperature or at a safe holding temperature. For example, a cooking program may indicate that the set-point temperature is reduced to a lower temperature after the food product has been held at a higher temperature for a determined period of time. This feature may minimize or reduce undesirable texture changes in the food product that could occur if the food product is held at a relatively high temperature for an extended duration.

The cooking program may also include an indication relating to when the cooking program should be started. For example, the cooking program may wait for a command, wait a fixed amount of time, wait until the cooking appliance 104 is pre-heated, wait until the food product has been inserted into the cooking appliance, wait until a food product(s) is removed from the cooking appliance, etc.

The FPG system 108 may transmit various information or data to the cooking appliance 104 and/or the client computing devices 102. For example, the FPG system 108 may transmit a cooking program to the cooking appliance 104 to control the operation thereof. The FPG system 108 may also transmit to the client computing devices 102 a determination or estimation for when the cooking program will be completed. For example, the FPG system 108 may provide a notification on the client computing devices 102 that indicates that the core of the food product will be 1° C. below a set-point temperature at a certain time (e.g., 103 minutes, 6:00 .mu.m), so the user can plan to remove the food product from the cooking appliance 104 at that time.

The FPG system 108 may also provide suggestions to a user of the client computing devices 102 based on food products currently or previously cooked by the user. For example, the FPG system 108 may recommend side dishes, certain recipes or a particular doneness for a food product based on feedback gathered from past behavior of the user. Such feedback may be obtained by direct query of the user or may be obtained indirectly based on selections or actions performed by the user (e.g., selecting a particular doneness, selecting recipes in a certain class of recipes).

In some implementations, the time-series data may be filtered before used in other algorithms or methods. For example, noise may be reduced or removed from the time-series data using one or more low pass filters, total variation minimization methods, moving averages, iterative moving averages, polynomial or rational exponential fitting using various norms (e.g., L1 or L2) for minimization, or the like. In some implementations, localized disruptions, such as spikes or missing data points, may be removed. In some implementations, variable time-series data may be changed into fixed time-series data through interpolation, or fixed time-series data may be changed to variable time-series data.

Using the time-series data and the state of the cooking appliance 104, the FPG system 108 may measure or determine one or more liquid bath characteristics, food product characteristics, and/or liquid bath and food product interaction characteristics. Liquid bath characteristics may include, but are not limited to, volume, mass, initial temperature, thermal loss or gain from the environment through conduction through the container, thermal loss or gain from the environment from radiation, thermal loss to the environment from evaporation, or change in mass and volume from evaporation.

Food characteristics may include, but are not limited to, surface area, mass, volume, shape, initial temperature, state (e.g., partially frozen, fully frozen, slushy, thawed).

Liquid bath and food product interaction characteristics may include the efficiency of the liquid bath to heat the food product as measured by the thermal heat transfer coefficient between the liquid and the food product. Liquid bath and food product interaction characteristics may also include when one or more pieces of a food product are inserted into the liquid bath, which could occur before the liquid starts to heat, while the liquid is heating or after the liquid has heated to a determined temperature.

Using the time-series data and one or more of the characteristics discussed above, the FPG system 108 may perform various functions. For example, the FPG system 108 may determine or estimate how long it will take the liquid bath 116 to reach a set-point temperature. As another example, the FPG system 108 may determine or estimate when the food product 118 will be heated to a particular temperature. After heating the food product 118 to the particular temperature, the FPG system 108 may either hold the liquid bath 116 at that temperature or reduce the temperature to a safe holding temperature.

The FPG system 108 may also generate a rapid or accelerated cooking program, as discussed below with reference to FIGS. 5A and 5B. Additionally, if there is a failure, such as a power interruption, the FPG system 108 may determine whether the food is still safe for consumption. For example, the FPG system 108 may determine for how long and at what temperatures the food product was in a range that promotes foodborne pathogen growth. Further, after a recognized power interruption, the FPG system 108 may determine whether any modifications to the cooking program are required and cause such modifications to be implemented.

In some implementations, it may be desirable for the cooking appliance 104 and/or the circulator 114 to obtain location information. For example, in some regions or countries, terms may have different meanings (e.g., the meaning of "medium rare" may vary across geographic locations). As another example, the location of the cooking appliance 104 may be used to determine a local boiling point for a liquid, which may in turn be used to adjust the cooking program, for example, to limit temperatures to below the local boiling point. The cooking appliance 104 and/or the circulator 114 may receive geographic location information automatically (e.g., via GPS) or manually (e.g., via user input) and account for differences in terminology due to geographic location. In some implementations, the cooking appliance 104 and/or the circulator 114 may receive location information from one or more of the user computing devices 102, and utilize such location information as an approximation for the location of the cooking appliance and/or the circulator. Thus, in some implementations, the cooking appliance 104 and/or the circulator 114 may include location specific functionality without requiring dedicated location determination hardware (e.g., a GPS receiver) by utilizing the location determination hardware of other computing devices physically located nearby.

FIG. 2 and the following discussion provide a brief, general description of the components forming an exemplary networked environment 100 including the FPG system 108, cooking appliance 104 and computing devices 102 (only one shown) in which the various illustrated implementations can be implemented. The networked environment 100 may, for example, implement the various functions and operations discussed immediately above in reference to FIG. 1. Although not required, some portion of the implementations will be described in the general context of computer-executable instructions or logic, such as program application modules, objects, or macros being executed by a computer. Those skilled in the relevant art will appreciate that the illustrated implementations as well as other implementations can be practiced with other computer system or processor-based device configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The implementations can be practiced in distributed computing environments where tasks or modules are performed by remote processing devices, which are linked through a communications network. In a distributed computing environment, program modules may be located in both local and remote memory storage devices.

The FPG system 108 may take the form of a conventional PC, server, or other computing system executing logic or other machine executable instructions. The FPG system 108 includes one or more processors 206, a system memory 208 and a system bus 210 that couples various system components including the system memory 208 to the processor 206. The FPG system 108 will at times be referred to in the singular herein, but this is not intended to limit the implementations to a single system, since in certain implementations, there will be more than one FPG system 108 or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") and random access memory ("RAM"). A basic input/output system ("BIOS"), which may be incorporated into at least a portion of the ROM, contains basic routines that help transfer information between elements within the FPG system 108, such as during start-up. Some implementations may employ separate buses for data, instructions and power.

The data storage 108B of the FPG system 108 also may include a hard disk drive for reading from and writing to a hard disk, and an optical disk drive and a magnetic disk drive for reading from and writing to removable optical disks and magnetic disks, respectively. The optical disk can be a CD or a DVD, while the magnetic disk can be a magnetic floppy disk or diskette. The hard disk drive, optical disk drive and magnetic disk drive communicate with the processor 206 via the system bus 210. The hard disk drive, optical disk drive and magnetic disk drive may include interfaces or controllers (not shown) coupled between such drives and the system bus 210, as is known by those skilled in the relevant art. The drives and their associated computer-readable media provide nonvolatile storage of computer-readable instructions, data structures, program modules and other data for the FPG system 108. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system, one or more application programs, other programs or modules, and program data.

The application program(s) may include logic capable of providing customized food preparation guidance or instructions to the cooking appliance 104 directly or through the user computing device 102. For example, where the user or customer selects one or more starting conditions and/or ending preferences, the FPG system 108 may determine one or more food preparation parameters based on the starting conditions or ending preferences. For example, the one or more starting conditions may relate to food type, food size, food weight, starting temperature, altitude, geographic location, or the like. Ending preferences may include temperature, texture, "doneness," taste, or the like. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 206 to provide additional functionality such as geolocation data and three-dimensional position data to the processor. For example, such information may be used with captured image data to determine the size and shape of a food product using structure from the motion determination processes. As another example, in some regions or countries, terms may have different meanings (e.g., the meaning of "medium rare" may vary across geographic locations). The processor may receive geographic location information automatically (e.g., via GPS) or manually (e.g., via user input) and account for differences in terminology due to geographic location. The application program(s) may, for example, be stored within the system memory 208 as one or more sets of logic or one or more sets of machine executable instructions.

The system memory 208 may include communications programs that permit the FPG system 108 to access and exchange data with other networked systems or components, such as the cooking appliance 104, other computing devices 102, an external computer system, or the like.

The operating system, application programs, other programs/modules, program data and communications can be stored on the system memory or other data storage.

Authorized personnel can enter commands (e.g., system maintenance, upgrades, etc.) and information (e.g., cooking simulation parameters, equations, models, etc.) into the FPG system 108 using a user interface 212 that includes one or more communicably coupled input devices such as a touch screen or keyboard, a pointing device such as a mouse, and/or a push button. Other input devices can include a microphone, joystick, game pad, tablet, scanner, biometric scanning device, etc. These and other input devices are connected to the processor 206 through an interface such as a universal serial bus ("USB") interface that couples to the system bus 210, although other interfaces such as a parallel port, a game port or a wireless interface or a serial port may be used. The user interface 212 may include a monitor or other display device that is coupled to the system bus 210 via a video interface, such as a video adapter. In at least some instances, the input devices may be located proximate the FPG system 108, for example when the system is installed at the system user's premises. In other instances, the input devices may be located remote from the FPG system 108, for example when the system is installed on the premises of a service provider.

In some implementations, the FPG system 108 operates in an environment 100 (FIG. 1) using one or more of the logical connections to optionally communicate with one or more remote computers, servers and/or other devices via one or more communications channels, for example, one or more networks 110. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 110. Further, a database interface 252, which is communicatively linked to the system bus 210, may be used for establishing communications with the nontransitory processor-readable storage medium or data store 108B, which may be a part of the FPG system 108 or at least in operative communication therewith. For example, the data store 108B may include a repository for storing information regarding cooking programs, cooking simulation parameters, cooking simulation models, media files depicting ending gradations or preferences for food products (e.g., images or videos depicting texture and/or consistency of an egg yolk, textures and/or consistency of an egg white, images depicting exterior of a steak, images depicting an interior of a steak), end user account information (e.g., user cooking appliances and parameters therefor, user preferences, etc.), end user computing device information, system user specific information relevant to providing one or more customized food preparation instructions to the end user, or combinations thereof. In some implementations, the database interface 252 may communicate with the data store 108B via the networks 110.

In the networked environment 100 (FIG. 1), program modules, application programs, or data, or portions thereof, can be stored in another server computing system (not shown). Those skilled in the relevant art will recognize that the network connections shown in FIG. 2 are only some examples of ways of establishing communications between computers, and other connections may be used, including wirelessly. In some implementations, program modules, application programs, or data, or portions thereof, can even be stored in other computer systems or other devices (not shown).

The processor 206, system memory 208, network port 256 and database interface may be communicatively coupled to each other via the system bus 210, thereby providing connectivity between the above-described components. In alternative implementations, the above-described components may be communicatively coupled in a different manner than illustrated in FIG. 2. For example, one or more of the above-described components may be directly coupled to other components, or may be coupled to each other, via intermediary components (not shown). In some implementations, system bus 210 is omitted and the components are coupled directly to each other using suitable connections.

The computing device 102 can include any device, system or combination of systems and devices having at least wired or wireless communications capabilities. In most instances, the computing device 102 includes additional devices, systems, or combinations of systems and devices capable of providing graphical data display capabilities. Examples of such computing devices 102 can include without limitation, cellular telephones, smart phones, tablet computers, desktop computers, laptop computers, ultraportable or netbook computers, personal digital assistants, handheld devices, and the like.

The computing device 102 may include one or more processors 282 and nontransitory computer- or processor-readable media or memory, for instance one or more nonvolatile memories 284 such as read only memory (ROM) or FLASH memory and/or one or more volatile memories 286 such as random access memory (RAM).

The computing device 102 may include one or more transceivers or radios 288 and associated antennas 290. For example, the computing device 102 may include one or more cellular transceivers or radios, one or more Wi-Fi® transceivers or radios, one or more Bluetooth® transceivers or radios, and one or more Bluetooth® Low Energy along with associated antennas. The computing device 102 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

The computing device 102 may include a user input/output subsystem, for example including a touchscreen or touch sensitive display device 292A and one or more speakers 292B. The touchscreen or touch sensitive display device 292A can include any type of touchscreen including, but not limited to, a resistive touchscreen or a capacitive touchscreen. The touchscreen or touch sensitive display device 292A may present a graphical user interface, for example in the form of a number of distinct screens or windows, which include prompts and/or fields for selection. The touchscreen or touch sensitive display device 292A may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example, a microphone, a barometer (e.g., for altitude estimation), an alphanumeric keypad, a QWERTY keyboard, a joystick, scroll wheel, touchpad or similar physical or virtual input device. For example, the computing device 102 may include a microphone that allows for voice control of the computing device.

The computing device 102 may include one or more image capture devices 294, for example, cameras with suitable lenses, and optionally one or more flash or lights for illuminating a field of view to capture images. The image capture device(s) 294 may capture still digital images or moving or video digital images. Image information may be stored as files via the non-volatile memory 284, for example.

Some or all of the components within the computing device 102 may be communicably coupled using at least one bus 296 or similar structure adapted to transferring, transporting, or conveying data between the devices, systems, or components used within the computing device 102. The bus 296 can include one or more serial communications links or a parallel communications link such as an 8-bit, 16-bit, 32-bit, or 64-bit data bus. In some implementations, a redundant bus (not shown) may be present to provide failover capability in the event of a failure or disruption of the primary bus 296.

The processor(s) 282 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 282, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 282 upon initial application of power. The processor(s) 282 may also execute one or more sets of logic or one or more machine executable instruction sets loaded from the volatile memory 286 subsequent to the initial application of power to the processor 282. The processor 282 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 282 to provide additional functionality such as geolocation data and three-dimensional position data to the processor 282.

The transceivers or radios 288 can include any device capable of transmitting and receiving communications via electromagnetic energy.

Non-limiting examples of cellular communications transceivers or radios 288 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 288 can include more than one interface. For example, in some instances, the cellular transceivers or radios 288 can include at least one dedicated, full- or half-duplex, voice call interface and at least one dedicated data interface. In other instances, the cellular transceivers or radios 288 can include at least one integrated interface capable of contemporaneously accommodating both full- or half-duplex voice calls and data transfer.

Non-limiting examples of Wi-Fi® transceivers or radios 288 include various chipsets available from Broadcom, including BCM43142, BCM4313, BCM94312MC, BCM4312, and chipsets available from Atmel, Marvell, or Redpine. Non-limiting examples of Bluetooth® transceivers or radios 288 include various chipsets available from Nordic Semiconductor, Texas Instruments, Cambridge Silicon Radio, Broadcom, and EM Microelectronic.

As noted, nontransitory computer- or processor-readable media can include non-volatile storage memory 284 and in some implementations may include volatile memory 286 as well. At least a portion of the memory may be used to store one or more processor executable instruction sets for execution by the processor 282. In some implementations, all or a portion of the memory may be disposed within the processor 282, for example in the form of a cache. In some implementations, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing applications or "apps" executable by the processor 282 may be stored in whole or in part in at least a portion of the memory 284, 286. In at least some instances, the applications may be downloaded or otherwise acquired by the end user, for example using an online marketplace such as the Apple App Store, Amazon Marketplace, or Google Play marketplaces. In some implementations, such applications may start up in response to selection of a corresponding user selectable icon by the user or consumer. The application can facilitate establishing a data link between the computing device 102 and the FPG system 108 or the cooking appliance 104 via the transceivers or radios 288 and communication networks 110.

As discussed in more detail below, the application(s) may include logic or instructions to provide the end user with access to a number of graphical screens or windows with prompts, fields, and other user interface structures that allow the user or consumer to obtain food preparation instructions, control or guidance via the FPG system 108. Such may include, for example, logic or machine executable instructions for various screens or windows.

The cooking appliance 104 can include a device, system or combination of systems and devices that implement the disclosed functionality. In some implementations, the cooking appliance 104 has wired or wireless communications capabilities and includes additional devices, systems, or combinations of systems and devices capable of providing graphical data display capabilities. Examples of such cooking appliances can include without limitation, thermal immersion circulators and vessels, water ovens, baking ovens, induction cookers, and the like.

The cooking appliance 104 may include one or more processors 260 and nontransitory computer- or processor-readable media, for instance one or more nonvolatile memories 262 such as read only memory (ROM) or FLASH memory and/or one or more volatile memories 264 such as random access memory (RAM).

The cooking appliance 104 may include a cooking chamber 112 (e.g., a container, vessel) with one or more heaters 124 positioned therein to, for example, heat a fluid (e.g., water, air) inside the cooking chamber. The cooking chamber 112 may be insulated and may include a selectively closable cover (e.g., lid, door). The cooking appliance 104 may also include one or more circulator(s) or circulator pumps 122 that stir a fluid. As discussed above, the cooking appliance 104 may also include one or more sensors or detectors 126 that sense or detect one or more characteristics, such as temperature, pressure, power, motion, fluid flow, presence or absence of a food product, etc. The circulator(s) 122, heater(s) 124, and sensor(s) 126 may be operatively coupled to the one or more processors 260. The sensors 126 may include one or more of a thermocouple, thermistor, platinum resistance temperature detector (RTD), positive temperature coefficient (PTC) heater/element, blackbody/infrared emissions detector, voltage sensor, current sensor (e.g., shunt resistor, current transformer, Hall effect sensor, magnetometer/GMR (giant magnetoresistive)), resistance sensor, barometer (e.g., for altitude estimation), etc.

The cooking appliance 104 may include one or more transceivers or radios 266 and associated antennas 268. For example, the cooking appliance 104 may include one or more cellular transceivers or radios, one or more Wi-Fi® transceivers or radios, one or more Bluetooth® transceivers or radios, and one or more Bluetooth® Low Energy transceivers or radios, along with associated antennas. The cooking appliance 104 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

The cooking appliance 104 may include a user input/output subsystem 128, for example including a touchscreen or touch sensitive display device and one or more speakers. The touchscreen or touch sensitive display device can include any type of touchscreen including, but not limited to, a resistive touchscreen or a capacitive touchscreen. The touchscreen or touch sensitive display device may present a graphical user interface, for example in the form of a number of distinct screens or windows, which include prompts and/or fields for selection. The touchscreen or touch sensitive display device may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example a microphone, an alphanumeric keypad, a QWERTY keyboard, a joystick, scroll wheel, touchpad or similar physical or virtual input device. For example, the cooking appliance 104 may include a microphone that allows for voice control of the cooking appliance.

Some or all of the components within the cooking appliance 104 may be communicably coupled using at least one bus 270 or similar structure adapted to transferring, transporting, or conveying data between the devices, systems, or components used within the cooking appliance 104. The bus 270 can include one or more serial communications links or a parallel communications link such as an 8-bit, 16-bit, 32-bit, or 64-bit data bus. In some implementations, a redundant bus (not shown) may be present to provide failover capability in the event of a failure or disruption of the primary bus 270.

The processor(s) 260 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 260, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 260 upon initial application of power. The processor(s) 260 may also execute one or more sets of logic or one or more machine executable instruction sets loaded from the volatile memory 264 subsequent to the initial application of power to the processor 260. The processor 260 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 260 to provide additional functionality such as geolocation data and three-dimensional position data to the processor 260.

The transceivers or radios 266 can include any device capable of transmitting and receiving communications via electromagnetic energy.

Non-limiting examples of cellular communications transceivers or radios 266 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 266 can include more than one interface. For example, in some instances, the cellular transceivers or radios 266 can include at least one dedicated, full- or half-duplex, voice call interface and at least one dedicated data interface. In other instances, the cellular transceivers or radios 266 can include at least one integrated interface capable of contemporaneously accommodating both full- or half-duplex voice calls and data transfer.

Non-limiting examples of Wi-Fi® transceivers or radios 266 include various chipsets available from Broadcom, including BCM43142, BCM4313, BCM94312MC, BCM4312, and chipsets available from Atmel, Marvell, or Redpine. Non-limiting examples of Bluetooth® transceivers or radios 266 include various chipsets available from Nordic Semiconductor, Texas Instruments, Cambridge Silicon Radio, Broadcom, and EM Microelectronic.

As noted, nontransitory computer- or processor-readable medium can include non-volatile storage memory and in some implementations may include a volatile memory as well. At least a portion of the memory is used to store one or more processor executable instruction sets for execution by the processor 260. In some implementations, all or a portion of the memory may be disposed within the processor 260, for example in the form of a cache. In some implementations, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing programs executable by the processor 260 may be stored in whole or in part in at least a portion of the memory 262, 264. In at least some instances, the applications may be downloaded or otherwise acquired by the end user, for example using an online marketplace. In some implementations, such applications may start up in response to selection of a corresponding user selectable icon by the user or consumer. The application can facilitate establishing a data link between the cooking appliance 104 and the FPG system 108 or the computing device 102 via the transceivers or radios 266 and communication networks 110.

In some implementations, some of the components of the cooking appliance 104 may be embodied in a computing device separate from the cooking chamber 112, such as in the example shown in FIG. 1. In some implementations, the cooking appliance 104 may be an integrated device that includes some or all of the aforementioned components. Further, it should be appreciated that although certain functions are described herein as being implemented in one of the client computing device 102, the cooking appliance 104, or the FPG system 108, some or all of such functions may be performed by numerous combinations of these devices, or may be performed in a different one or more of the devices than described above. In other words, the functionality described herein may be implemented in a highly distributed manner or may be implemented in a single self-contained device.

Figure 3:
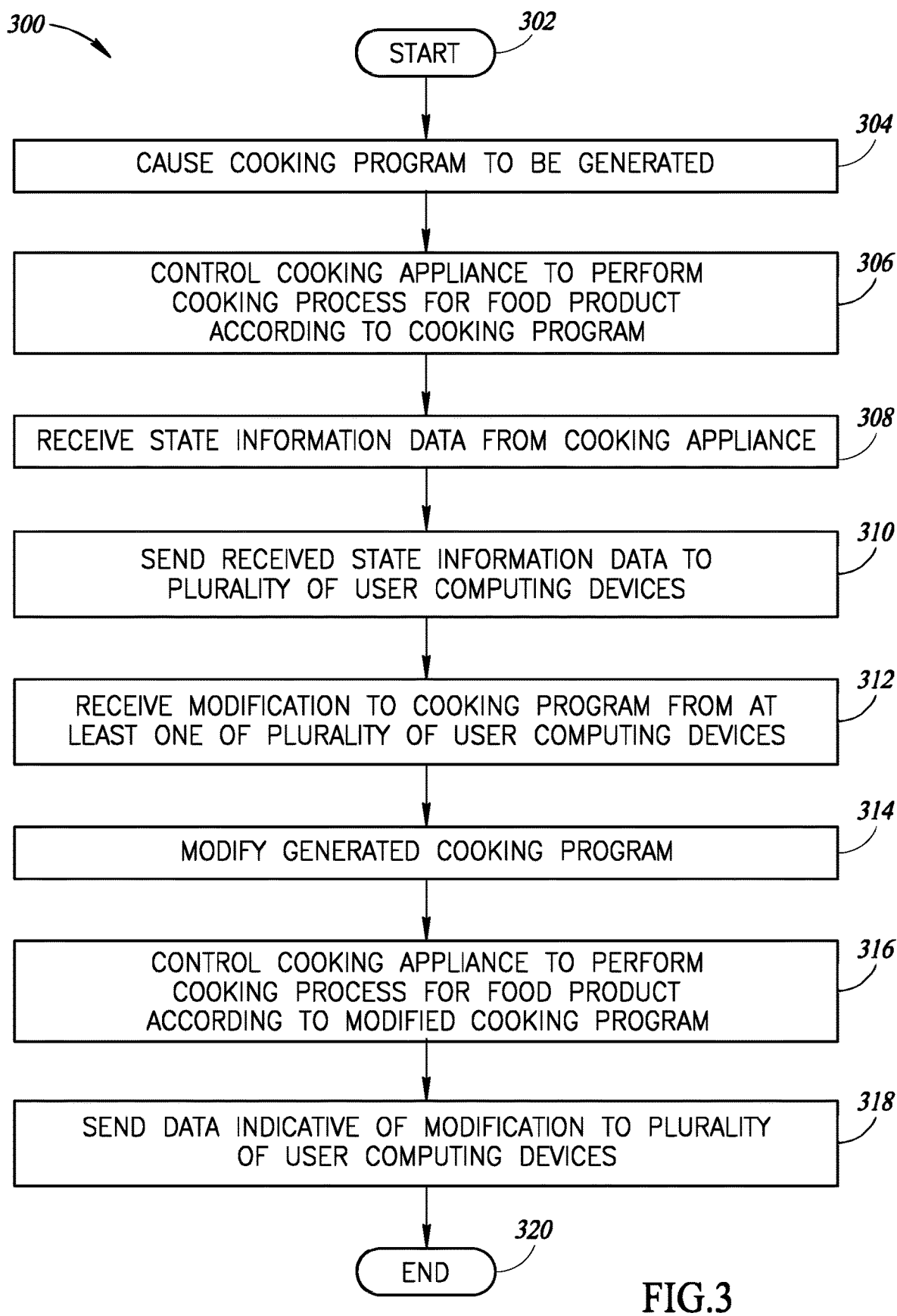
FIG. 3 is a flow diagram showing a method of operation of a processor-based device in a food preparation guidance system, according to at least one illustrated implementation.

FIG. 3 shows a method 300 of operating a processor-based device to control preparation of a food product in a food preparation guidance (FPG) system, such as the FPG system 108 of FIGS. 1 and 2. For explanatory purposes, the method 300 is discussed in the context of a sous vide cooking process, but the method is not limited to such a cooking process. For example, the method 300 may be implemented using a baking oven or other cooking appliance. As noted above, sous vide is a method of cooking food in a liquid bath or in a temperature-controlled steam environment for longer than normal cooking times at an accurately regulated temperature much lower than normally used for conventional cooking. In some instances, the food is sealed (e.g., liquid-tight, air-tight) in plastic bags. Sous vide cooking techniques typically employ temperatures around 55° C. to 80° C. for meats and higher for vegetables. The intention is to cook the item evenly, ensuring that the inside is properly cooked without overcooking the outside, and retain moisture.

The method 300 starts at 302. For example, the method 300 may start in response to an opening of a specific application or selection of an icon displayed on a display of a computing device. In response, the processor-based device may cause a display or presentation of a splash screen or an introduction screen.

At 304, at least one processor causes a cooking program to be generated. For example, at least one processor of an FPG system may generate a cooking program. The cooking program may include at least one of instructions or data usable by a cooking appliance to perform a cooking process for a food product. The cooking program may be downloaded or otherwise provided to the cooking appliance at any time prior to the cooking session.

At 306, the at least one processor controls the cooking appliance to perform the cooking process for the food product according to the cooking program. For example, at least one processor of the cooking appliance may control a heater element to heat a liquid bath according to the generated cooking program.

At 308, the at least one processor of the cooking appliance may receive state information data from the cooking appliance. Such state information data may include, for example, set-point temperature, current temperature, water level, estimated time until completion, estimated time until the food product should be placed in a cooking chamber of the cooking appliance, etc.

At 310, the at least one processor of the cooking appliance may send the received state information data to a plurality of user computing devices over at least one data communications channel. For example, the at least one processor of the cooking appliance may send state information data to a user's laptop computer, smartphone and tablet computer, so that the user may receive such data using any one of such devices. As another example, the at least one processor of the cooking appliance may send the state information data to a first user computing device associated with a first user and to a second user computing device associated with a second user.

At 312, the at least one processor may receive a modification to the cooking program (or other control instruction) from at least one of the plurality of user computing devices over the at least one data communications channel. At 314, responsive to receiving the modification to the cooking program, the at least one processor may modify the generated cooking program. At 316, the at least one processor may control the cooking appliance to perform the cooking process for the food product according to the modified cooking program. At 318, the at least one processor may send data indicative of the modification to the plurality of user computing devices over the at least one data communications channel.

As noted above, in some implementations the at least one processor may receive a modification to the cooking program or a control instruction from a first user computing device indirectly via a second user computing device. Such may be advantageous in instances when the second user computing device is not able to communicate directly with the cooking appliance and/or the FPG system.

As discussed above, multiple user computing devices may be used to remotely control a cooking appliance, and to receive data therefrom. Multiple user computing devices may communicate with the cooking appliance concurrently, or sequentially over the course of a cooking session. In some implementations, the cooking appliance acts as the primary source for the current state of the system, though that state may be replicated on multiple computing devices (e.g., user computing devices, cloud-based services). In some instances, changes to the state of the cooking appliance may be displayed on the user computing devices optimistically as if the changes had definitely occurred on the cooking appliance to minimize the perceived lag time, and conflicts or errors may be resolved later.

In some implementations, a single user computing device may be communicatively coupled to the cooking appliance via multiple communications channels (e.g., Bluetooth® Low Energy and Wi-Fi®), and may correctly resolve inconsistent commands. The cooking appliance may be connected to one or more controlling devices or web services, or may be temporarily disconnected, while still being able to reconstruct correct and consistent time series data in the cloud when reconnected. This time series data may be used to adaptively estimate the future state of the system, in particular when the system as a whole will reach a preset equilibrium temperature. In some instances, multiple control devices and/or cooking appliances may use short-range connections, such as Bluetooth® Low Energy, to form a mesh network for relaying control and state data to more distant controlling devices or cooking appliances. As discussed above, the approximate geospatial location of a cooking appliance without built-in GPS may be determined by proximity to a controlling device that implements GPS or other spatial positioning technology.

The method ends at 320, for example, at the completion of a cooking session.

Figure 4:
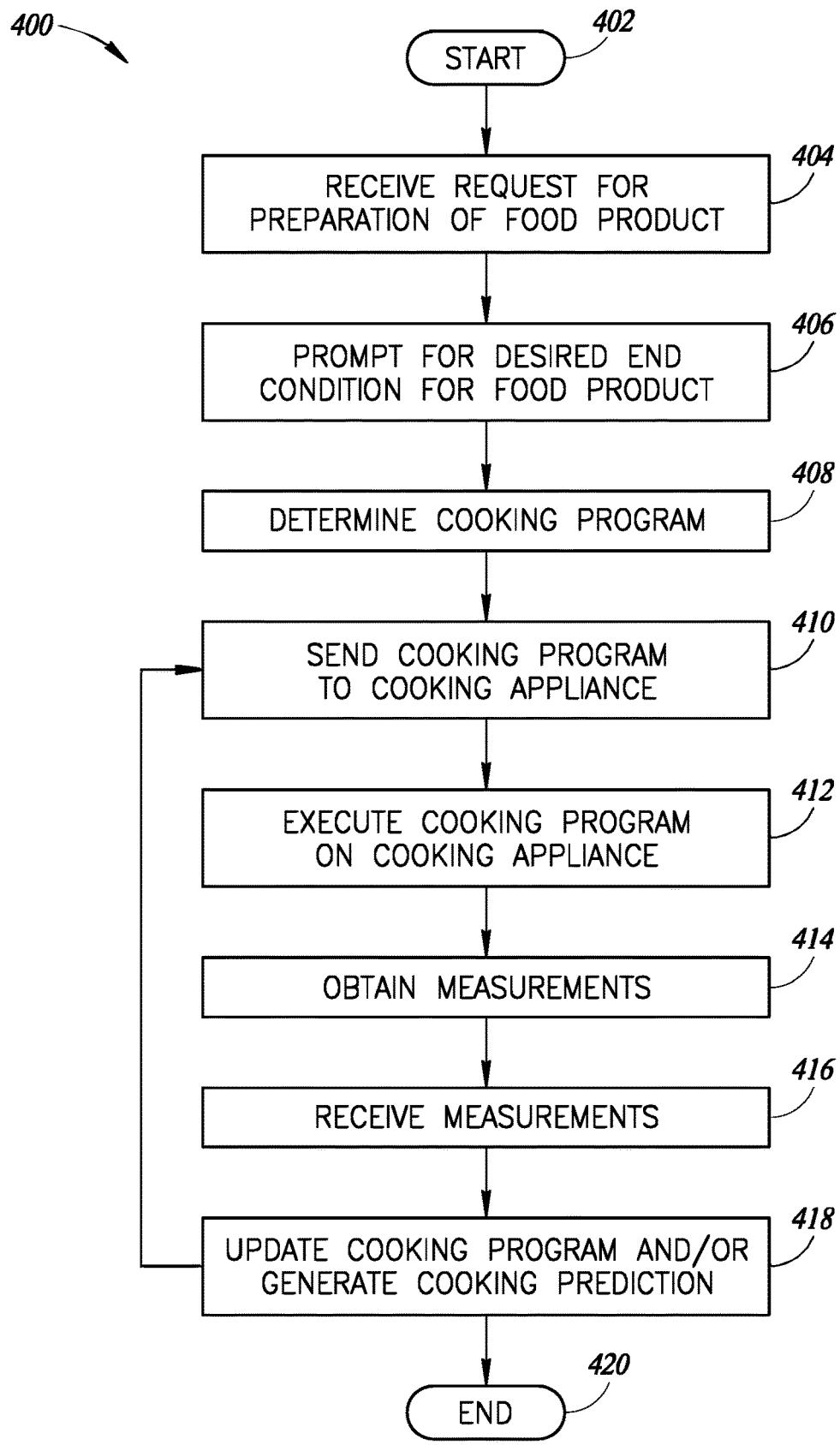
FIG. 4 is a flow diagram showing a method of operation of a processor-based device in a food preparation guidance system, according to at least one illustrated implementation.

FIG. 4 shows a method 400 of operating a processor-based device to control preparation of a food product in a food preparation guidance (FPG) system, such as the FPG system 108 of FIGS. 1 and 2. For explanatory purposes, the method 400 is discussed in the context of a sous vide cooking process, but the method is not limited to such a cooking process. For example, the method 400 may be implemented using a baking oven or other cooking appliance.

Notably, the approaches described herein provide updates to cooking programs and/or estimations about cooking processes by obtaining one or more measurements from a cooking appliance and making decisions based on the obtained measurements.

The method 400 starts at 402. For example, the method 400 may start in response to an opening of a specific application or selection of an icon displayed on a display of a computing device. In response, the processor-based device may cause a display or presentation of a splash screen or introduction screen.

At 404, the processor-based device may receive a request for preparation of a food product. For example, the processor-based device may receive a request for preparation of a steak from a user-operated client computing device over a communications network. The user may select a recipe or may manually enter instructions into a user interface via the client computing device and/or via the cooking appliance.

At 406, the processor-based device may provide a prompt for an ending condition, temperature, preference or characteristic for the selected food product, for instance, via a display of the computing device. For example, the processor-based device may display or cause to be displayed an egg white texture prompt screen (e.g., a visual prompt) that allows a user to view and scroll through images of egg whites having differing textures (e.g., runny, medium, firm). Various user interface elements may be employed, including those commonly associated with touchscreen interfaces allowing multi-finger input, tapping, and swiping. In some implementations, a set of at least two graphical prompts may include a set of still images in addition to or instead of a set of videos. In some implementations, each video or image may also include audio which may allow the user to observe additional information about a characteristic of the cooked food product (e.g., crispness, crunch, etc.). In some implementations, a set of audio clips with audio prompts and without visual prompts is provided. Audio prompts may include spoken word prompts or sound prompts (e.g., sound of egg cracking).

The processor-based device may receive a selection indicative of an ending condition or preference for the food product. For example, the processor-based device may detect an input or selection of a slide bar via a touchscreen display.

At 408, the processor-based device determines a cooking program based at least in part on the received selection indicative of the food product to be prepared and/or an ending preference. For example, the processor-based device may perform one or more simulations utilizing the selected food product and ending preferences as inputs to determine a cooking time and a cooking temperature to cook the food product to achieve the selected ending preferences (e.g., texture, consistency, doneness). The processor-based device may determine one or more general food preparation parameters for the cooking program using any suitable methods, such as one or more simulations, modeling, one or more lookup tables, one or more analytical or numerically solvable equations, or the like. In some instances, a cooking program or protocol may include a schedule of a plurality of temperatures which vary as a function of time (e.g., a first temperature for a first time period, a second temperature for a second time period, and a third temperature for a third time period).

At 410, the processor-based device sends the generated or determined cooking program to the cooking appliance. For example, the FPG system 108 of FIG. 1 may send the determined cooking program to the cooking appliance 104 over the communications network 110 directly or via the client computing device 102.

At 412, the cooking appliance executes the cooking program. For example, the cooking program may provide instructions to the cooking appliance to heat a liquid bath to 60° C., to alert a user to insert the food product into the liquid bath when the liquid bath reaches 60° C., and to hold the temperature of the liquid bath for three hours.

At 414, the cooking appliance obtains measurements, and stores these measurements in a data store as a time-series. As discussed above, these measurements may be obtained by sensors (FIG. 2) that directly or indirectly measure one or more of temperature, power, fluid flow, the presence or absence of a food product, liquid level, power disruptions, etc. This time-series is a record of the obtained measurements at different times. The time-series data may be arranged in chronological order or reverse chronological order. The time period between measurements may be constant or variable.

At 416, the processor-based device may receive some or all of the measurements obtained by the cooking appliance. For example, the FPG system 108 of FIG. 1 may obtain some or all of the measurements from the cooking appliance 104 over the communications network 110 directly or via the client computing device 102. In some implementations, the cooking appliance may transmit a subset of the time-series data that includes the most recent measurement or the measurements obtained since the previous successful transmission of the measurement data to the client computing device or to the FPG system.

In addition to receiving the time-series data, the processor-based device may receive metadata, such as the type of cooking appliance, user information, or recipe information. If the transmission of data includes all the information needed by the FPG system to determine or update the cooking program, the transmission may be referred to as a "system state" transmission. If the transmission of data does not include all the information needed by the FPG system but is sufficient when combined with previously sent information, the transmission may be referred to as a "system state update" transmission.

At 418, the processor-based device may update the cooking program and/or generated one or more projections about the cooking process based on the system state of the cooking appliance. As discussed above, the system state may be a synthesis of several system state updates. The updated cooking program may be sent to the cooking appliance for execution thereby. For example, the updated cooking program may alter control of one or more operational parameters of the cooking appliance (e.g., temperature, time, speed, humidity, pressure, fan speed). The one or more generated projections may be provided to a user via a suitable interface, such as a user interface of one or more computing devices and/or a user interface of the cooking appliance.

For example, based on the system state, the FPG system may determine how long it will take for a liquid bath of the cooking appliance to reach a set-point temperature. As another example, the FPG system may determine when the food product will be heated to a particular temperature and, after heating to the particular temperature, may hold the liquid bath at that temperature or may reduce the temperature to a safe holding temperature.

The FPG system may also determine when the food product has been heated to a particular fraction of the difference between the temperature of the liquid bath and the initial temperature of the food product. For example, the FPG system may determine when the food product has been heated to 90% of the difference between the temperature of the liquid bath and the initial temperature of the food product. After heating the food product to this temperature, the liquid bath may either be held at that temperature or reduced to a safe holding temperature.

The processor-based device may display or cause to be displayed the determined more accurate cooking process projection on the display of one or more computing devices or the cooking appliance, as discussed above. The user may then utilize the provided projection for planning or other purposes.

At 420, the processor-based device ends the method 400. The method 400 terminates at 420 until called again. Alternatively, the method 400 may repeat, for example, with control returning to 404 or 410. Alternatively, the method 400 may run concurrently with other methods or processes, for example, as one of multiple threads on a multi-threaded processor system.

In some implementations, the FPG system may utilize feedback to a priori adjust one or more parameters (e.g., food preparation parameters, prompts, recommendations) for an individual user, group, friends of one or more individual users, geographic locale, or all users. For example, in some implementations, the FPG system gathers ratings from users, and the ratings may be used to adjust one or more parameters or recommendations for one or more users. As another example, the FPG system may gather information manually or automatically from users or from third party entities (e.g., social networks, retail web sites, etc.) that may be used to adjust one or more parameters, recommendations, or other features of the system for one or more users.

As noted above, the cooking appliance, computing devices, and/or the FPG system may utilize various inputs to generate cooking programs, updates to cooking programs, and/or projections about one or more cooking processes. One such input is power delivered by the cooking appliance. Power may be measured directly or indirectly, or may be derived using one or more parameters. For example, actual power may be measured using a sensor (see FIG. 2) that senses one or both of voltage and current drawn by the cooking appliance or supplied by the cooking appliance to a heating element.

Generally, power (P) may be calculated using any two of voltage (V), current (I) and resistance (R). Specifically, $P = V \times I = V^2/R = I^2 \times R$. Instantaneous power may be calculated using any pair of measurements taken at approximately the same time. Average power may be calculated by averaging a series of instantaneous power calculations. Average power may also be obtained using the equation:

$$P_{AVG} = V_{RMS} \times I_{RMS} \times \cos(\theta)$$

where $V_{RMS}$ and $I_{RMS}$ are the root-mean-square voltage and current, respectively, and $\theta$ is the phase angle between the voltage signal and the current signal.

Voltage and current may be measured using any suitable voltage measurement device. For example, current may be measured via a shunt resistor, current transformer, Hall effect sensor, etc. Resistance may be directly measured relative to a known value reference resistor, or indirectly via any other measurements responsive to resistance.

As another example, power may be measured or determined based on a power percentage or ratio from a controller, such as a PID controller. For example, if a system's maximum power is known to be 1,000 watts, and a PID controller is prescribing 50% of maximum power, it can be determined that the current output power is 50% of 1000 watts, or 500 watts. In some implementations, the PID controller's output may be pre-scaled such that the output is already in terms of watts, for example.

In some implementations, the power may be measured or determined based on a measured difference in temperature between an inlet ("cold side") and an outlet ("hot side") of a heater/circulator pump (see FIG. 2) or other stirring system. Such temperature difference may be proportional to the specific heat of the transported working medium (e.g., water) and the transported mass of the working medium. In some implementations, the cooking appliance may be programmed to deliver a specified power (e.g., in watts), which power may be known or obtained and used by the FPG system (e.g., instead of or in addition to obtaining power measurements) for updating cooking programs or generating projections about cooking processes.

Another input that may be used by the FPG system is temperature. For example, the cooking appliance may be equipped with a temperature sensor positioned at an inlet of a circulator pump or stirring system. The temperature sensor may be any suitable sensor, such as a thermocouple, thermistor, platinum resistance temperature detector (RTD), positive temperature coefficient (PTC) heater/element, or blackbody/infrared emissions detector.

Another input that may be used by the FPG system is fluid flow. Any suitable device may be used to measure fluid flow in a cooking appliance including, but not limited to, a PTC heater/element, an impeller, etc.

Other inputs that may be used by the FPG system include user inputs. Such user inputs may include information about when a food product has been inserted into the cooking appliance, characteristics about the food product or information about the cooking appliance. For example, characteristics of the food product may include its mass or weight, volume, surface area, type, temperature, etc. Information about the cooking appliance may include the type of vessel in which a thermal immersion circulator has been inserted, whether a vessel is covered, the size of a vessel, the volume of liquid in a liquid bath, whether a vessel is insulated, etc.

The FPG system may also make assumptions about a cooking appliance which may circumvent the need to measure any one or more of voltage, current or resistance to determine power delivery. As an example, the FPG system may use the output from a PID controller to approximate the power delivered by the heater. Further, the FPG system may make assumptions about the efficiency of a liquid bath for heating a food product, as measured by a surface heat transfer coefficient of the liquid to the food product. The FPG system may also make assumptions about a cooking appliance (e.g., vessel size) based on characteristics of the cooking appliance identified during previous use of the cooking appliance or previous use of similar cooking appliances. The characterizations of the cooking appliance may be based on a manufacturer's design or on empirical measurements of the same or similar cooking appliances, or based on physics calculations. As an example, assumptions may be made relating to the electrical properties of a heater element of a cooking appliance, such as the heater element's resistance versus temperature behavior.

As another example, the ratio of on-time to off-time (i.e., duty cycle) of the heater element of a cooking appliance may be used to scale an assumed or measured peak power to determine an estimate of average power. The duty cycle measurement may come from a variety of sources including, but not limited to, the output of a PID controller that controls operation of the heating element.

The FPG system may also make assumptions related to the voltage of the power source. For example, a 120 volt AC line in the United States may be assumed to be 120 volt AC+/−N %, where N is a number. Similarly, the FPG system may make assumptions related to the power factor of the power source. For example, the power factor of the power source may be assumed to be close to 1, such that current is in phase with voltage.

Figure 5A:
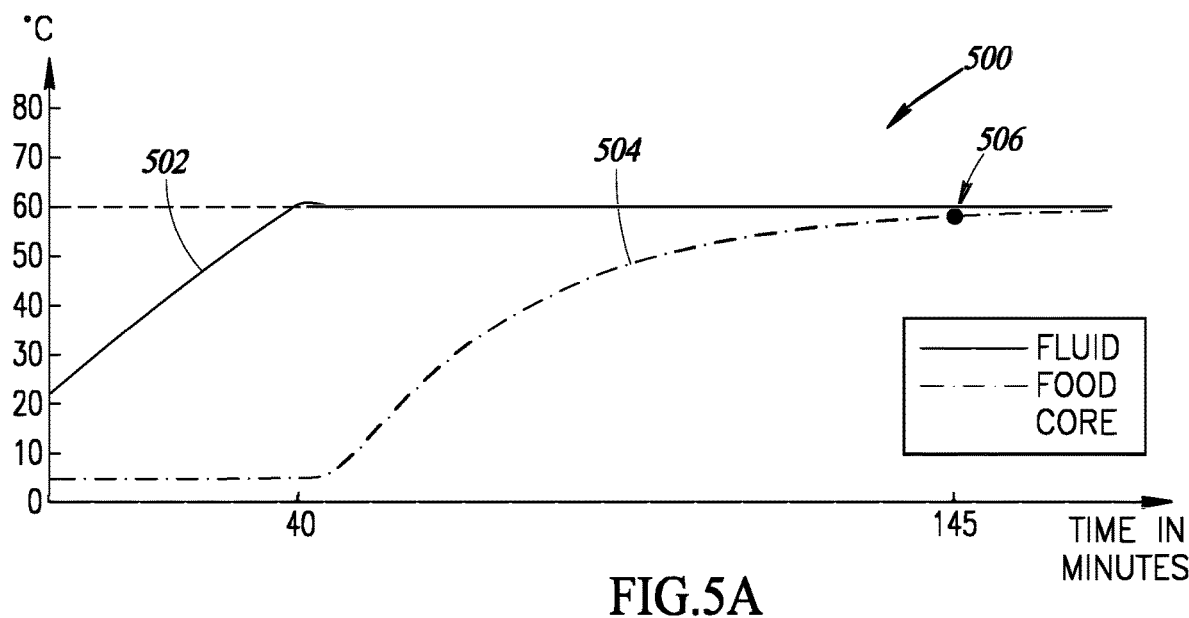
FIG. 5A is a graph showing temperatures for a liquid bath of a cooking appliance and a core of a food product during a cooking process, according to at least one illustrated implementation.

FIG. 5A is a graph 500 showing temperatures for a liquid bath 502 of a cooking appliance and temperatures for a core of a food product 504 placed in the liquid bath during a normal cooking process. In this illustration, the food product 504 is a roast that is 52 millimeters thick and weighs 1.1 kilograms. The food product 504 is cooked to a core temperature of 60° C., in this example. At the start of the cooking process (i.e., zero minutes), the heating element of the cooking appliance begins to heat the liquid bath 502 from an initial temperature of about 22° C. to the set-point temperature of approximately 60° C. After about 40 minutes, the liquid bath 502 has reached the set-point temperature of 60° C. shortly after the liquid bath 502 has reached the set-point temperature, the food product 504 is inserted into the liquid bath 502 of the cooking appliance. The temperature of the core of the food product 504 rises slowly until it reaches about 1° C. less than 60° C. (i.e., 59° C.) at about 145 minutes, as indicated by an arrow 506. The user may then remove the food product 504 from the liquid bath.

Figure 5B:
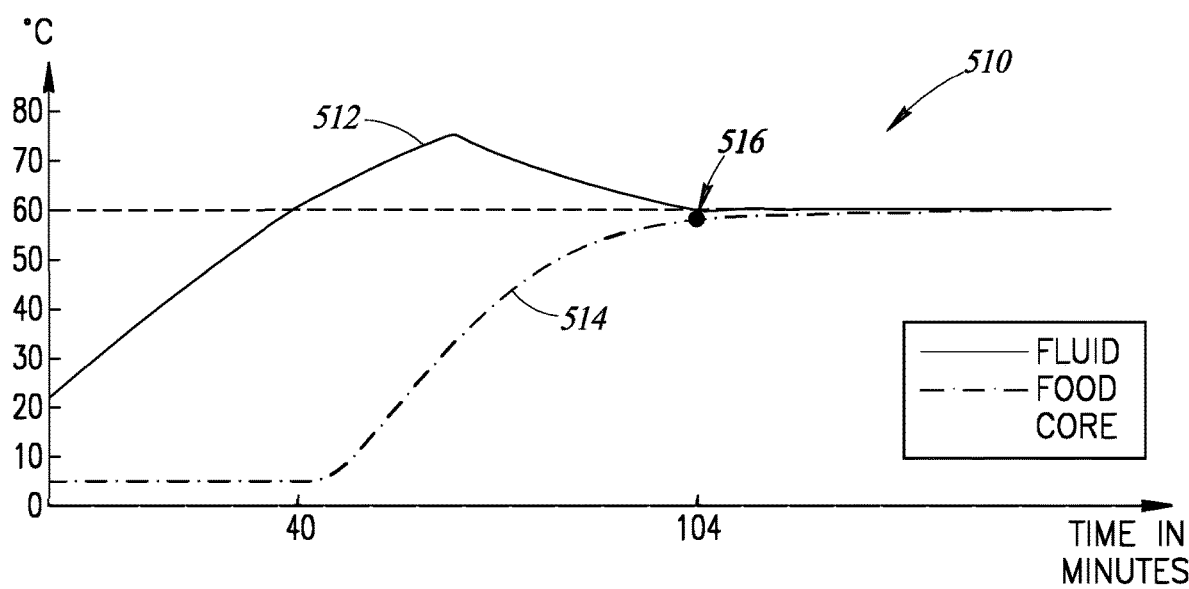
FIG. 5B is a graph showing temperatures for a liquid bath of a cooking appliance and a core of a food product during an accelerated cooking process, according to at least one illustrated implementation.

FIG. 5B is a graph 510 showing temperatures for a liquid bath 512 of a cooking appliance and temperatures for a core of a food product 514 placed in the liquid bath during an accelerated cooking process. The food product 514 is also a roast with the same size and weight as the food product 504 of FIG. 5A. At zero minutes, the heating element of the cooking appliance begins to heat the liquid in the liquid bath 512 from an initial temperature of about 22° C. to an elevated temperature above the desired set-point temperature of 60° C. In the illustrated example, the heating element heats the liquid bath 512 to an elevated temperature of about 75° C.

After about 40 minutes, the liquid has reached 60° C. Shortly after the liquid bath 512 has reached 60° C., the food product 514 is inserted into the liquid bath 512 of the cooking appliance while the temperature of the liquid bath continues to rise to about 75° C., which is about 15° C. above the set-point temperature of 60° C. Once the temperature of the liquid bath reaches 75° C., the temperature control of the cooking appliance allows the temperature of the liquid bath 512 to fall to the set point temperature of 60° C. The temperature of the core of the food product 514 rises relatively rapidly (compared to the normal cooking process) due to the liquid bath 512 being at the elevated temperature. After a determined time, the cooking program controls the cooking appliance to lower the temperature of the liquid bath 512 to the set-point temperature of 60° C. for the remainder of the cooking process. In the illustrated example, the temperature of the liquid bath 512 is lowered from 75° C. to 60° C. after about 70 minutes from the beginning of the cooking process. In some implementations, the time at which the liquid bath 512 is maintained at an elevated temperature is at least partially dependent on a determination or estimation of when the food product 514 will reach the set point temperature and/or an estimation of how long it will take for the liquid bath 512 to cool from the elevated temperature to the set point temperature. Generally, the liquid bath 512 should be at or near the set-point temperature at or before the time when the temperature of the food product 514 approaches the set-point point temperature.

In the illustrated example, the temperature of the liquid bath 512 is reduced to the set-point temperature at about the same time the temperature of the core of the food product 514 reaches about 1° C. less than 60° C. (i.e., 59° C.) at 104 minutes, as indicated by an arrow 516. Thus, using the accelerated cooking process, the food product 514 is fully cooked in 104 minutes instead of 145 minutes. It should be appreciated that the various cooking parameters for an accelerated cooking process may be varied dependent on various factors, such as type of food, degree of acceleration desired, end preferences, etc.

FIGS. 6-15 show various exemplary screen print screens or windows which may be displayed as part of executing the method 400 for an FPG system that controls the cooking of a food product in a temperature controlled water bath (i.e., sous vide cooking process). Notably, the approach described herein provides users with media-based prompts (e.g., visual and/or audible prompts) depicting two or more choices for ending preferences for a food product that allow the user to easily select a desired ending preference for a cooked food product. The systems and methods then precisely control a cooking appliance to cook the selected the food product to achieve the selected desired ending preferences or characteristics. Such ending preferences or characteristics may relate to texture, consistency, doneness, crispness, and the like.

For example, a user may initially open a specific application or selection of an icon displayed on a display of a user computing device, such as one or more of the user computing devices 102 of FIG. 1. In response, the processor-based display may cause a display or presentation of a home screen or introduction screen, for instance, a home screen illustrated in a screen print screen 600 of FIG. 6. The home screen includes a scrollable list of icons for various food products, including a steak icon 602, a salmon icon 604 and a chicken icon 606 which depict pieces of steak, salmon and chicken, respectively. A multi-purpose icon 608 is also present in the bottom right-hand corner of the home screen 600 which may be used to display various data and which may be selected by the user to perform various functions. For example, the screen print screen 700 of the home screen of FIG. 7 depicts the multi-purpose icon 608 as showing a current temperature reading in .degree. C. for a liquid bath of a cooking appliance to which the user computing device is communicatively coupled.

Each of the food product icons 602, 604 and 606 in the home screen may also include a download indicator (e.g., indicator 610, 612) which notifies the user of whether the cooking program for a particular food product has been previously downloaded onto the user computing device. As shown, a "check mark" for the icons 610 and 612 may indicate that the respective cooking programs for the steak and the salmon have already been downloaded to the user computing device. As an example, the icons 610 and 612 may be shown as an "X" or an arrow to indicate that a cooking program has not yet been downloaded to the user computing device.

In some implementations, the food product icons may be hierarchically arranged. For example, food groups may be shown at a top level (e.g., beef, poultry), and then different cuts of each food group may be shown at a lower level. As a non-limiting example, the user may be allowed to sequentially select "beef," then "steak," then "ribeye."

Figure 6:
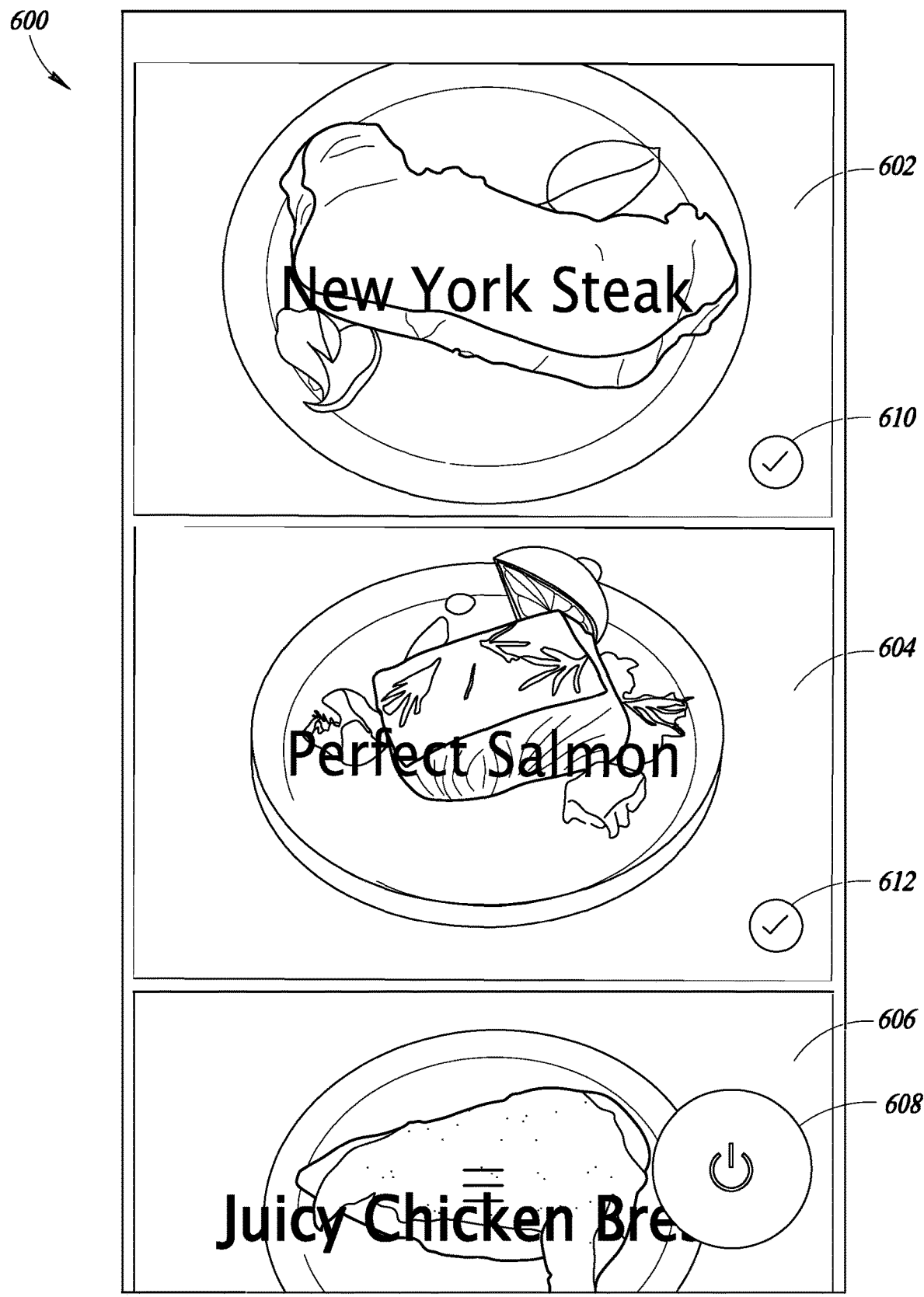
FIG. 6 is a screen print screen or window of a home screen of a graphical user interface (GUI) provided by a processor-based device for use in the food preparation guidance system of FIG. 1, according to at least one illustrated implementation.
Figure 7:
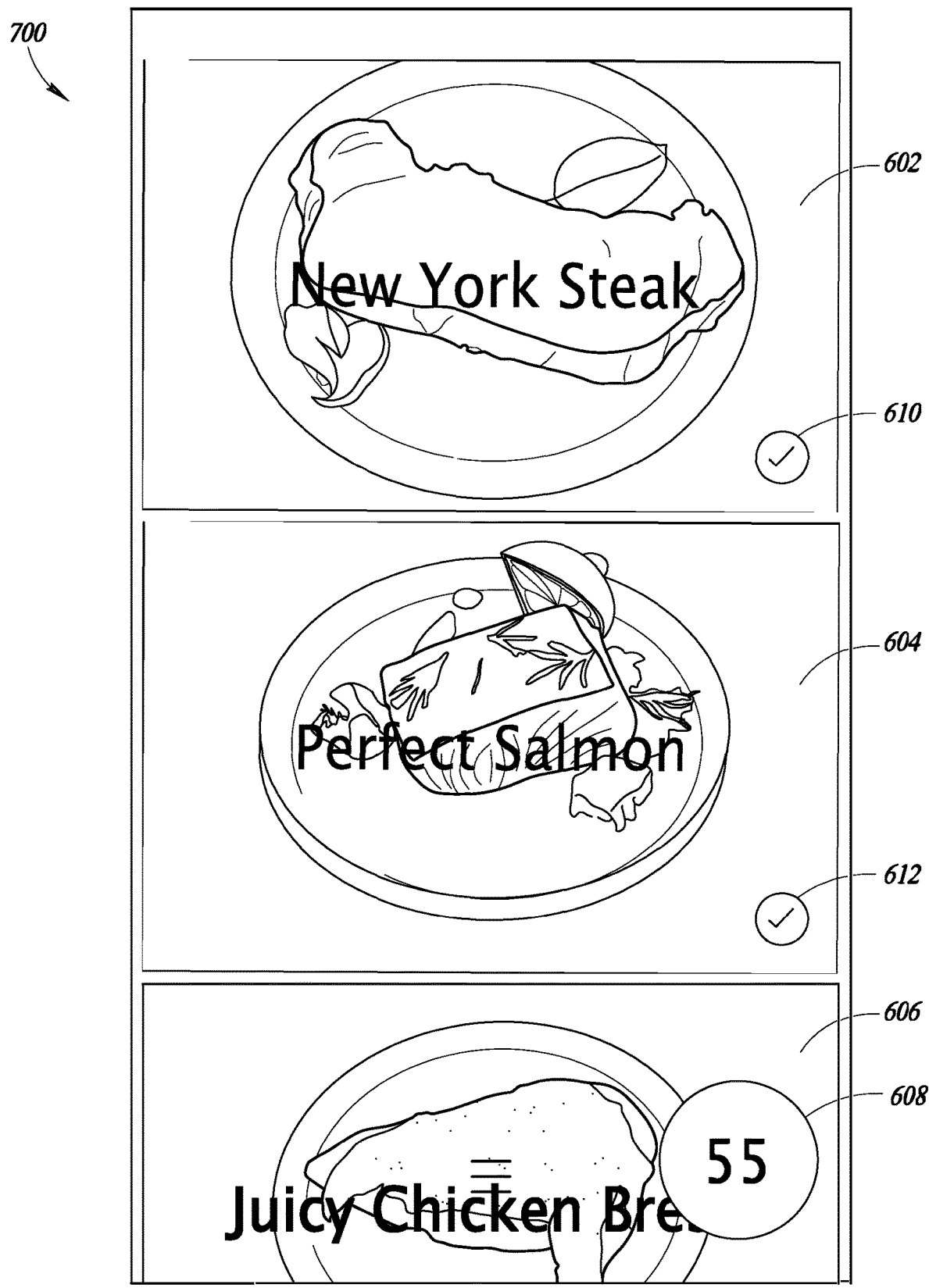
FIG. 7 is another screen print screen or window of the home screen of the graphical user interface (GUI), according to at least one illustrated implementation.
Figure 8:
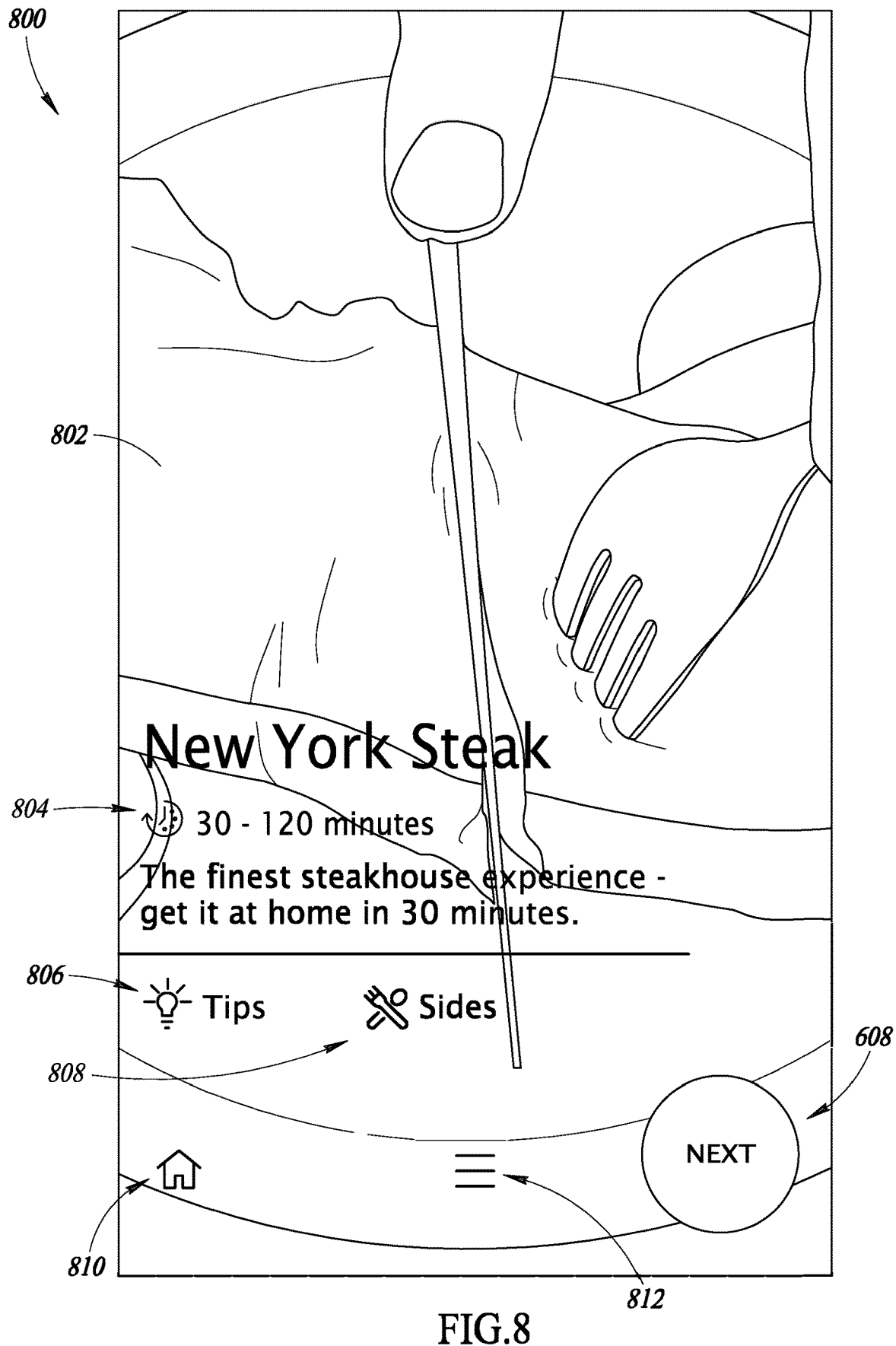
FIG. 8 is a screen print screen or window of a first steak cooking setup screen of the graphical user interface (GUI), according to at least one illustrated implementation.

FIG. 8 shows a screen print screen 800 for a steak cooking setup screen which may be displayed on the user computing device responsive to the user selecting the steak icon 602 displayed on the home screen (see FIGS. 6 and 7). The steak cooking setup screen may include an information section 804 which includes various information such as a title, an estimated cooking/preparation time, and a description. The steak cooking setup screen may also include a background image or video 802 of a cooked steak. For example, the steak cooking setup screen may include a background video of a user cutting a steak with a knife. The video may loop continuously while the steak cooking setup screen is displayed.

Figure 9:
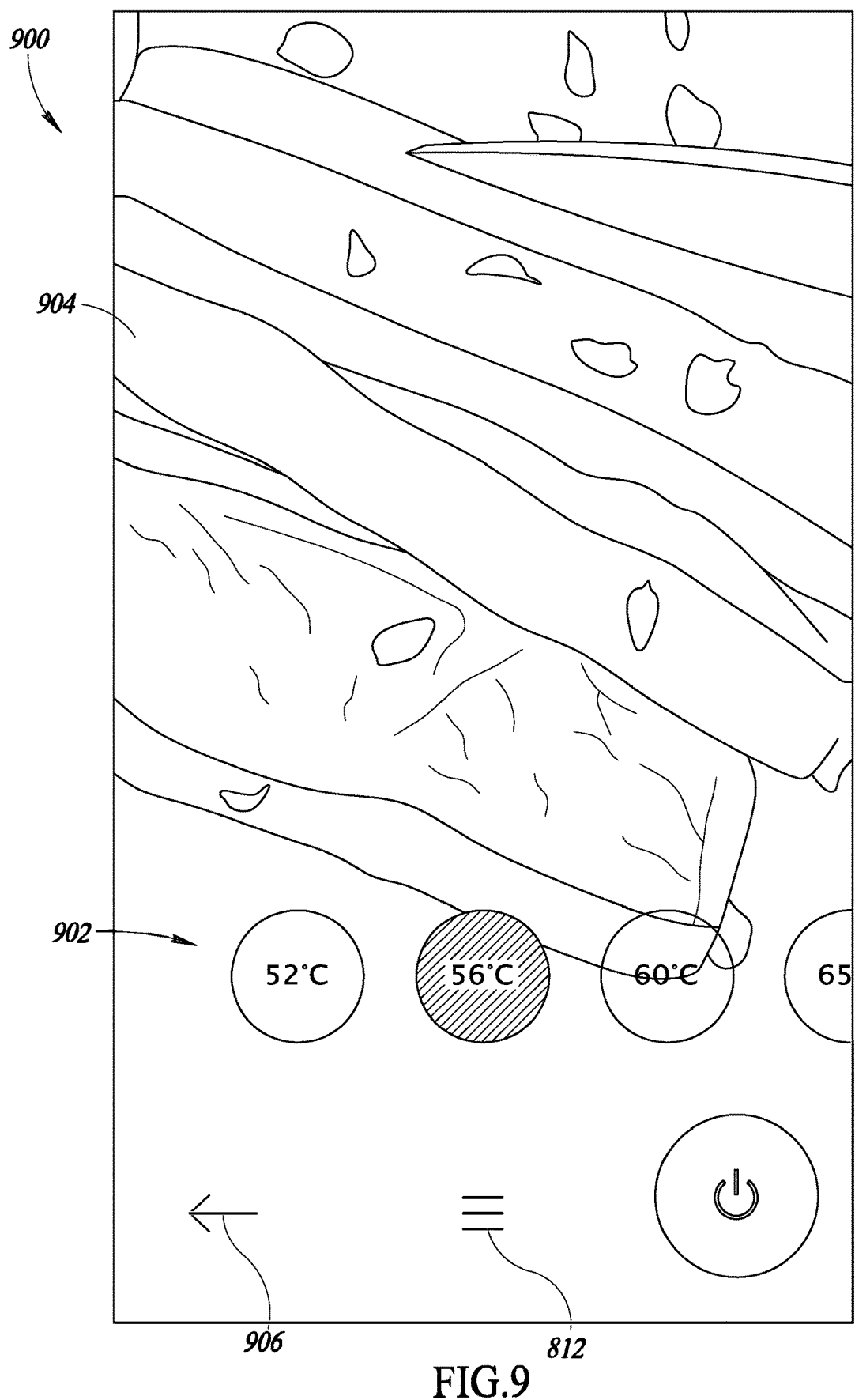
FIG. 9 is a screen print screen or window of a second steak cooking setup screen of the graphical user interface (GUI), according to at least one illustrated implementation.

The multi-purpose icon 608 may display the text "NEXT" to signal to the user that the icon may be selected to navigate to a next steak cooking setup screen (FIG. 9). The steak cooking setup screen may also include a home icon 810 to navigate to the home screen, and a menu icon 812 which, when selected, opens a menu which may include one or more user-selectable items (e.g., account profiles, notification settings, user preferences).

Figure 15:
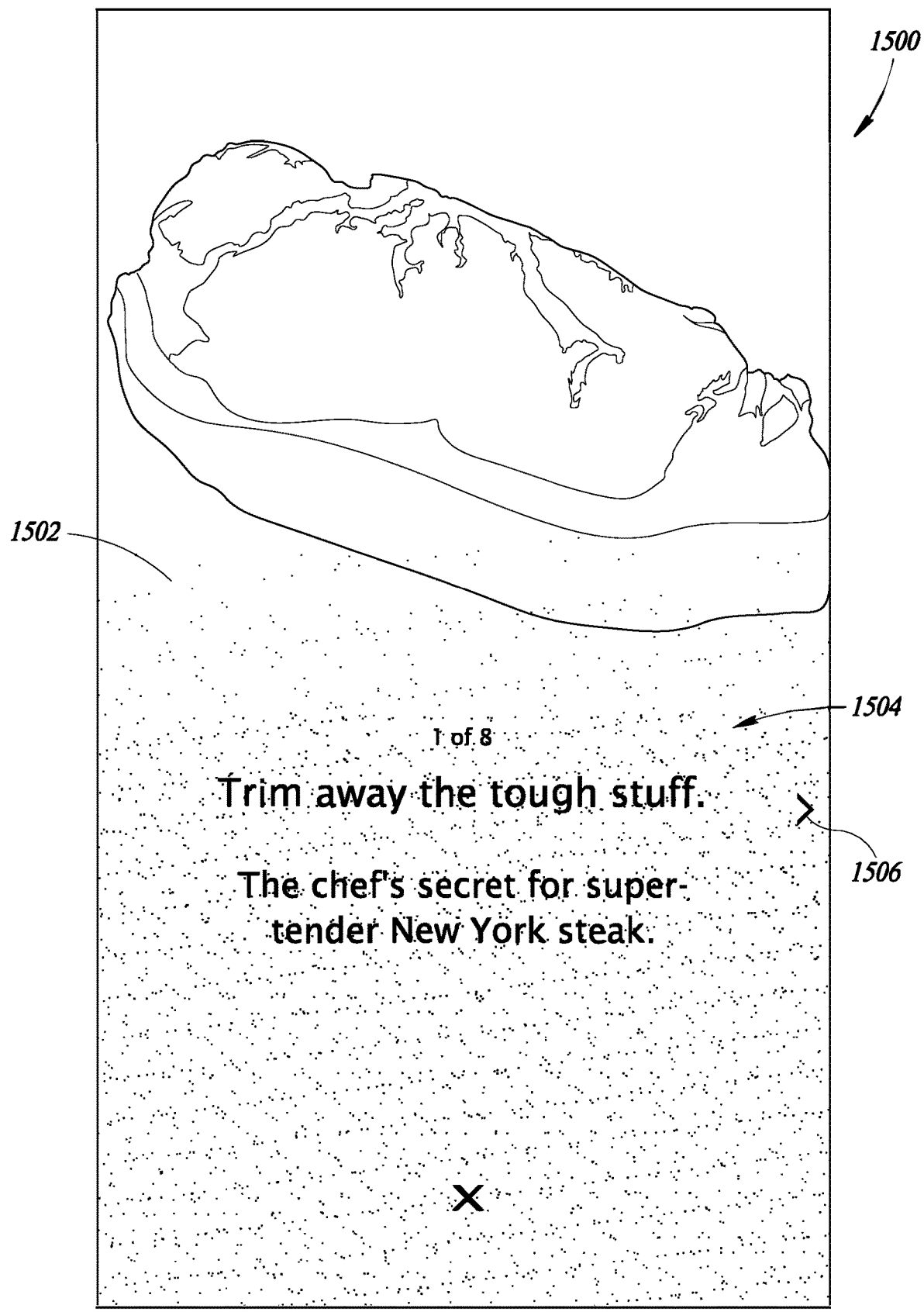
FIG. 15 is a screen print screen or window of a cooking tips screen of the graphical user interface (GUI), according to at least one illustrated implementation.

The steak cooking setup screen may also include a tips icon 806 which, when selected, causes a number of cooking tips to be provided to the user (see FIG. 15). The cooking tips may include one or more of text, audio, images, and/or videos.

The steak cooking setup screen may also include a sides icon 808 which, when selected, causes one or more side dishes to be presented to the user. The one or more side dishes may be dependent on the particular food product selected by the user. In some implementations, upon selection of the sides icon 808, recipes, or links to recipes, for one or more side dishes may be presented to the user so that the user may prepare one or more side dishes to accompany the selected food product.

FIG. 9 shows a screen print screen 900 of a second steak cooking setup screen which may be displayed on the user computing device responsive to the user selecting the "NEXT" multi-purpose icon 608 in the first steak cooking setup screen shown in the screen print screen 800 of FIG. 8. The second steak cooking setup screen of FIG. 9 includes a plurality of gradation icons 902, each corresponding to a different temperature (e.g., 52° C., 56° C., 60° C., 65° C.), cooking time, or descriptors of doneness (e.g., medium-rare, medium, medium-well). Upon selection of one of the icons 902, a background image or video 904 which depicts the food product when cooked at the selected temperature is displayed on the user computing device. For example, when the user selects the icon 902 labeled "56° C.," the background image or video 904 depicts a steak cooked to 56° C. The second steak cooking setup screen may also include a backward navigation icon 906 which, when selected, navigates backward to the steak cooking setup screen shown in FIG. 8.

In the illustrated implementation, the set of at least two graphical prompts include a plurality of videos (or animated images) each depicting a different texture or appearance of cooked steak. For example, as the user scrolls from left to right selecting the icons 902, videos depicting steaks cooked at various temperatures from rare to well-done may be displayed on the display of the computing device. Each video in the set of videos may be accompanied with textual description and/or an audio description. The audio description may be a narrative description and/or may include a sound which is made when the food product is cut, sliced, cracked, or placed on a dish or pan. In some implementations, each video has a relatively short duration (e.g., 2 seconds, 5 seconds, 10 seconds, etc.), and shows the food product (e.g., a steak) during an action, such as being placed onto a plate or being cut. Users watching one of the videos may observe the movement of the food product as it is placed on the plate or as the food product is cut to help the user determine whether the doneness, texture or consistency of the food product shown in a particular one of the videos, pictures or images is preferred. In some implementations, the videos, pictures or images allow the user to view both an exterior and an interior of the food product.

In some implementations, the set of at least two graphical prompts 406 includes a set of still images in addition to or instead of a set of videos. In some implementations, each video or image may also include audio which may allow the user to observe additional information about a characteristic of the cooked food product (e.g., crispness, crunch, etc.). In some implementations, a set of audio clips without visual prompts is provided.

In some implementations, the user may be able to select a gradation (e.g., temperature, time, doneness) other than the default gradations provided in the steak cooking setup screen so that the selection may be fine-tuned. For instance, in the illustrated example the icons 902 include adjacent selectable icons for 52° C. and 56° C. In some implementations, the user may be able to select a temperature between 52° C. and 56° C. (e.g., 54° C., 55.5° C.). As an example, the user may be able to select one of the icons 902 and slowly swipe to the left or right to respectively decrease or increase the temperature setting (or other gradation) relative to the selected icon. Thus, although background images or videos 904 may not be available for every possible gradation, the user is still able to select a particular desired gradation (e.g., between medium-rare and medium) which may be between or outside of the default gradations which include corresponding background images or videos 904.

The user may select one of the icons 902 indicative of an ending preference for the food product, which selection is detected by the at least one processor of the user computing device.

Figure 10:
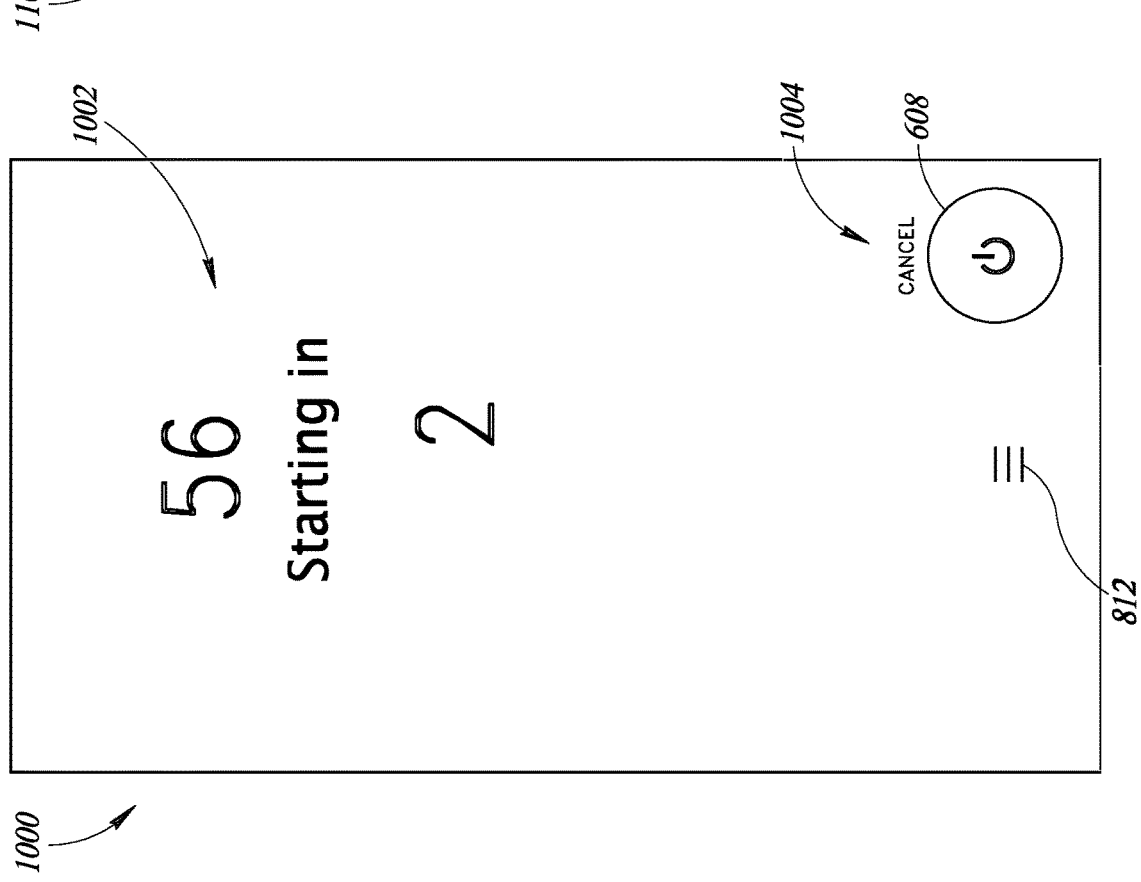
FIG. 10 is a screen print screen or window of a first cooking process screen of the graphical user interface (GUI), according to at least one illustrated implementation.

Responsive to the user selecting one of the icons 902, the user computing device may display a first cooking screen as shown by the screen print screen 1000 of FIG. 10. The first cooking screen includes an information section 1002 which displays a set point temperature (e.g., 56° C.) and a time when the cooking process is estimated to begin (e.g., "starting in 2 seconds"). The first cooking screen also includes the text "CANCEL" 1004 positioned above the multi-purpose icon 608 which, when selected, may cancel the cooking process.

Figure 11:
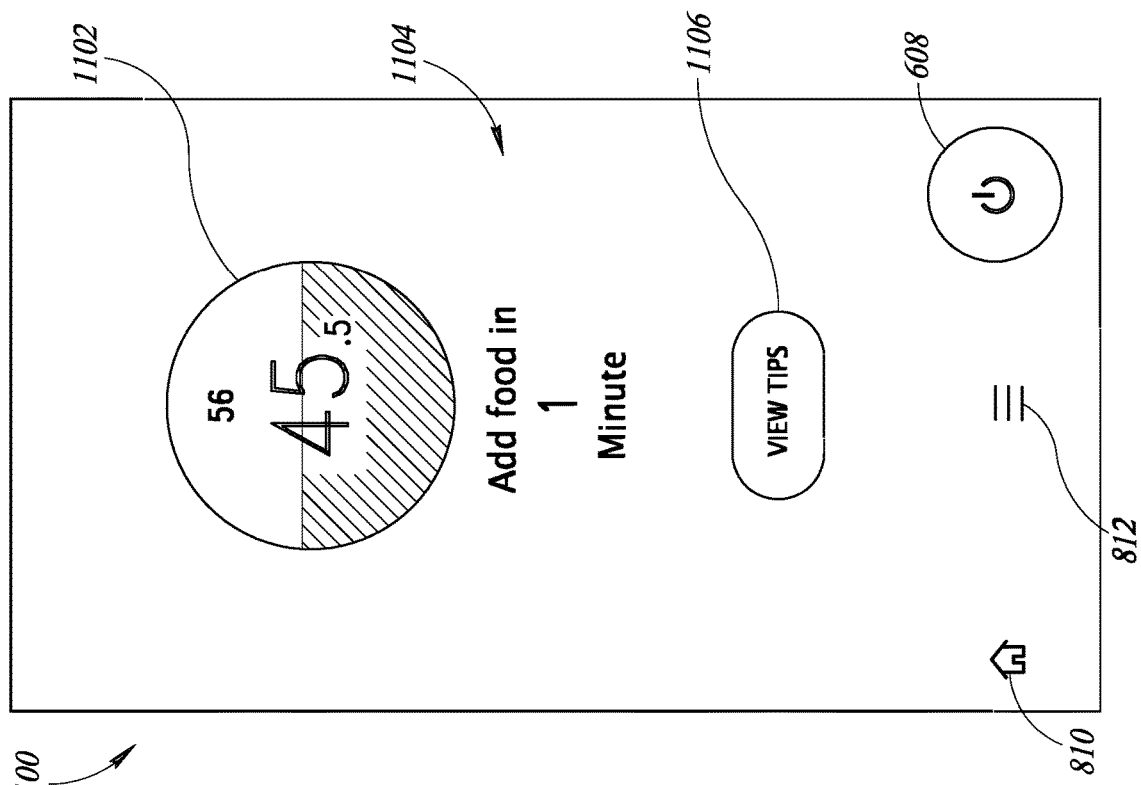
FIG. 11 is a screen print screen or window of a second cooking process screen of the graphical user interface (GUI), according to at least one illustrated implementation.

FIG. 11 shows a screen print screen 1100 for a second cooking screen which includes temperature display icon 1102 which provides a set point temperature setting in a relatively large font and a current temperature of the cooking appliance in a relatively small font below the desired temperature setting. Other user interface elements may be employed, including those commonly associated with touchscreen interfaces allowing multi-finger input, tapping, and swiping.

The second cooking screen shown in FIG. 11 also includes a notification section 1104 which instructs the user when to add the selected food product into a cooking chamber of the cooking appliance. In the illustrated example, the notification section 1104 instructs the user to "add food in 1 minute." The second cooking screen shown in FIG. 11 also includes a view tips icon 1106 which, when selected, may present one or more cooking tips to the user. Such cooking tips may include one or more of text, audio, images, or video.

Figure 12:
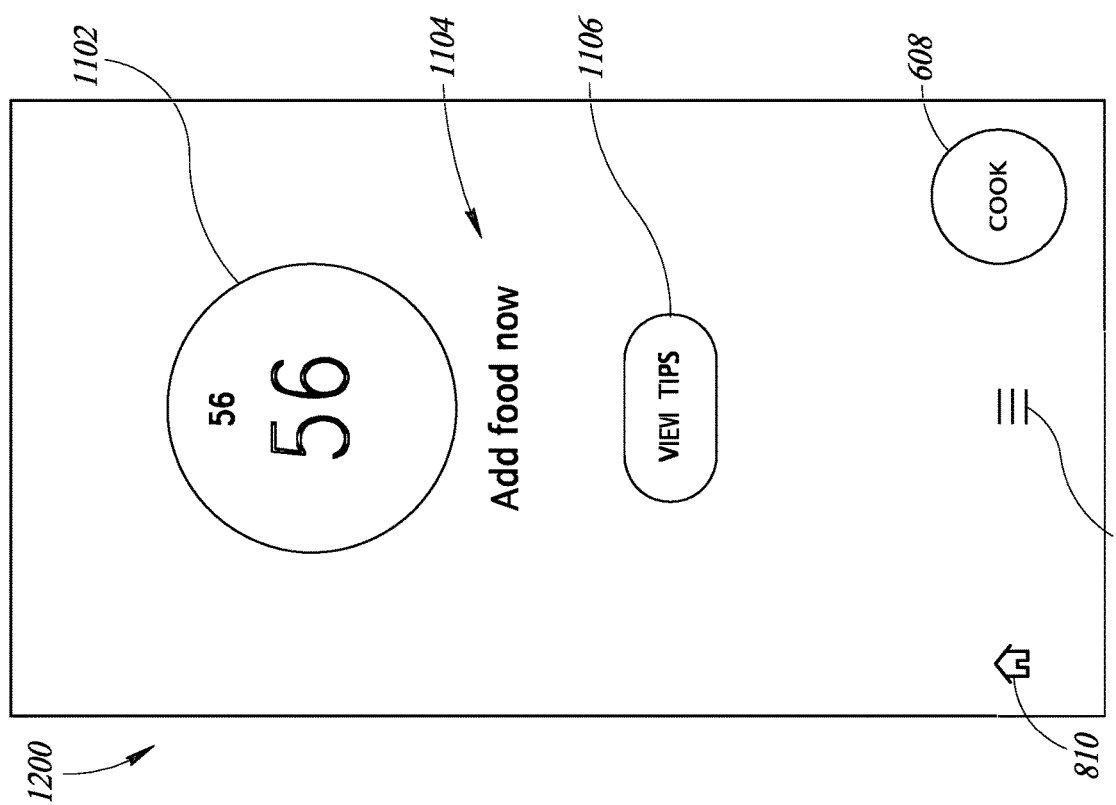
FIG. 12 is a screen print screen or window of a third cooking process screen of the graphical user interface (GUI), according to at least one illustrated implementation.

FIG. 12 shows a screen print screen 1200 of a third cooking screen which instructs the user to "add food now" in the notification section 1104. The notification may be a visual notification and/or an audible notification.

Figure 13:
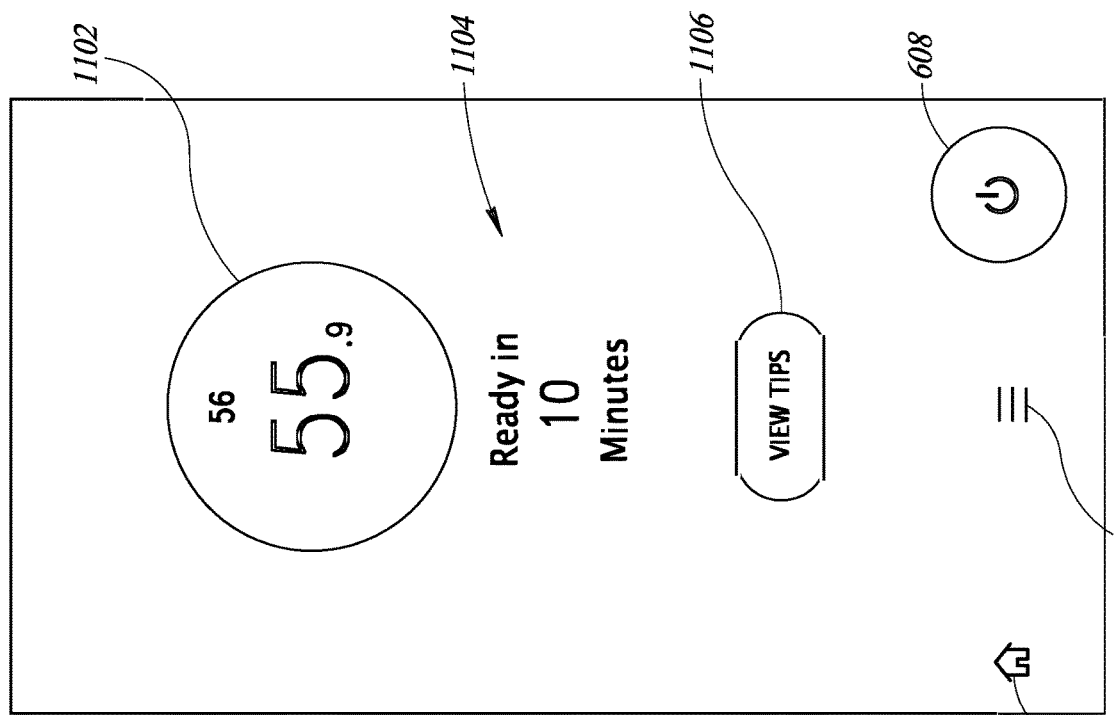
FIG. 13 is a screen print screen or window of a fourth cooking process screen of the graphical user interface (GUI), according to at least one illustrated implementation.

FIG. 13 shows a screen print screen 1300 of a fourth cooking screen which provides the user with an estimated time until the food product is cooked in the notification section 1104. In this example, the notification section 1104 displays the message "ready in 10 minutes." Such estimated time may be generated by the FPG system, as discussed above.

Figure 14:
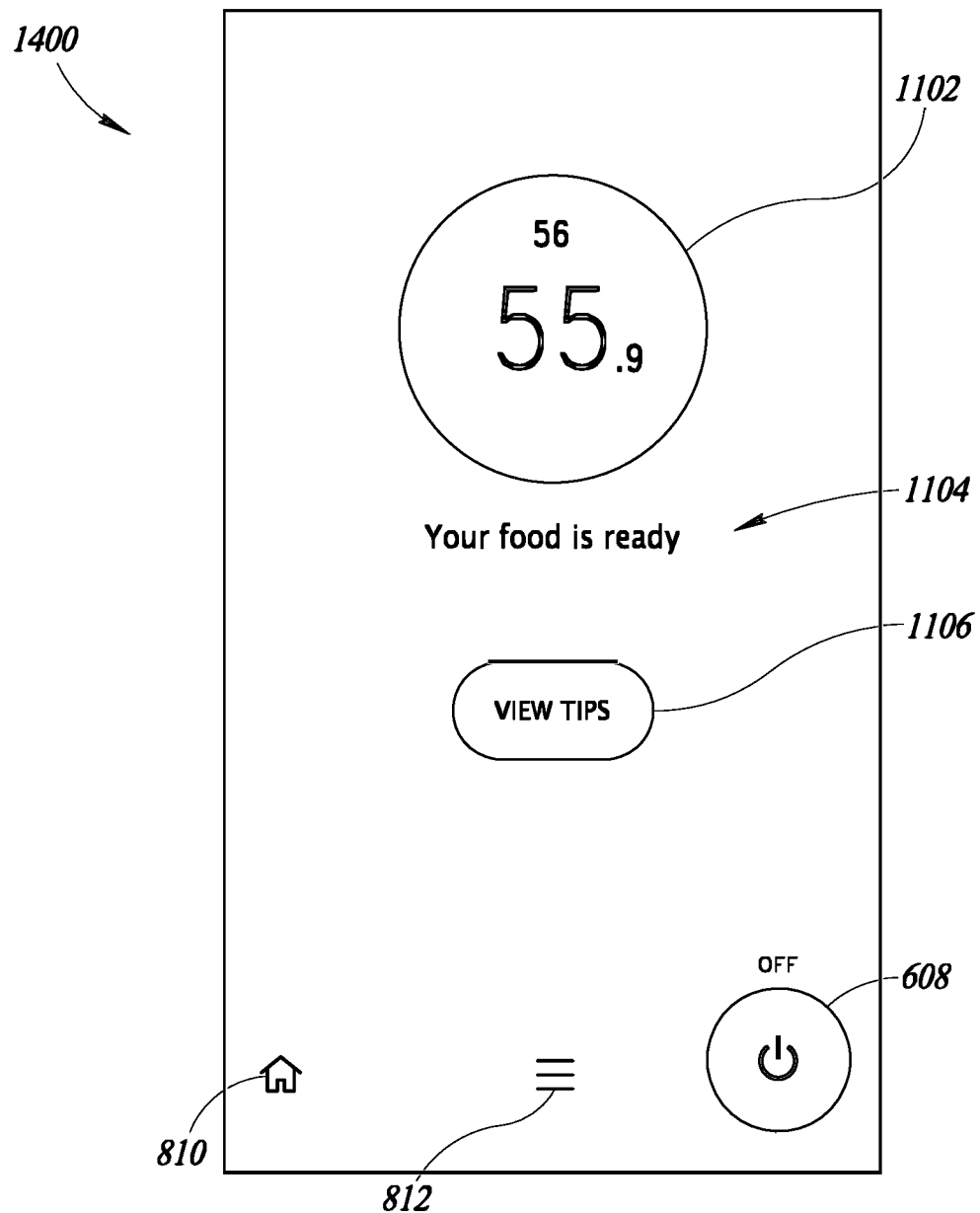
FIG. 14 is a screen print screen or window of a fifth cooking process screen of the graphical user interface (GUI), according to at least one illustrated implementation.

FIG. 14 shows a screen print screen 1400 of a fifth cooking screen which provides the user with an indication that the food product is ready in the notification section 1104. In this example, the notification section 1104 displays the message "your food is ready."

FIG. 15 shows a screen print screen 1500 of a tips screen which may be display responsive to the user selecting a tips icon, such as the tips icons 806 and 1104 of FIGS. 8 and 11, respectively. In this illustrative example, the tips screen includes a background image or video 1502 and a text section 1504 positioned below the background image or video. The tips screen also includes one more navigation icons 1506 which allow the user to navigate to multiple available cooking tips. In some implementations, the text section 1504 may provide an instruction or tip for an action (e.g., trimming a steak) and a corresponding background image or video 1502 may depict the action.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A method comprising:
   displaying, by a computer system, of a graphical user interface (GUI) at a client computing device, the GUI including:
   a plurality of selectable elements, each of the plurality of selectable elements corresponding to a different one of a plurality of temperature values and a food product to be cooked; and
   a video or image of the food product that dynamically changes in response to user interaction with any of the plurality of selectable elements to depict an end result of the food product cooked at a corresponding temperature;
   receiving, by the computer system from the client computing device via one or more computer networks, a first parameter value indicative of a particular temperature and a second parameter value indicative of the food product to be cooked;
   processing, by the computer system, the first parameter value and the second parameter value to determine an accelerated cooking process to initially heat fluid to a first temperature above a set-point temperature, and subsequently heat the fluid to a second temperature equal to the set-point temperature;
   transmitting, by the computer system, an accelerated cooking program to a cooking appliance, wherein the cooking appliance is configured to perform the accelerated cooking process to cook the food product in the fluid according to the accelerated cooking program based on the first and second parameter values;
   obtaining, by the cooking appliance, and storing, in a non-transitory processor-readable storage medium of the processor, parameter measurements indicative of the accelerated cooking process, wherein the parameter measurements include a plurality of temporally spaced temperature measurements and corresponding power measurements of power supplied to a heating element of the cooking appliance, such that the parameter measurements form a time-series data;

transmitting a subset of the time-series data from the cooking appliance to the computer system, the subset including a most recent parameter measurement obtained since a previous successful transmission of a previous subset of time-series data to the computer system;

determining, by the computer system, an update to the accelerated cooking program based at least in part on the parameter measurements;

transmitting the update to the accelerated cooking program to the cooking appliance to alter the accelerated cooking process; and generating and displaying, by the computer system, one or more projections in relation to the accelerated cooking process to the user, wherein the one or more projections are based on the parameter measurements.

2. The method of claim 1, wherein the video or image dynamically changes to depict the food product cooked to the particular temperature in response to user interaction with the particular selectable element.

3. The method of claim 1, further comprising:
in response to receiving the indication of the user selection, causing the GUI to display any of:
an indication of the particular temperature to which the food product will be cooked;
an indication of a current temperature of the cooking appliance;
an indication of a time when the cooking process by the cooking appliance will begin; or
an option to cancel the cooking process by the cooking appliance.

4. The method of claim 1, further comprising:
in response to receiving the indication of the user selection, causing the GUI to display a notification to the user to place the food product in the cooking appliance.

5. The method of claim 1, wherein the GUI displays an indication of a remaining time left to complete the cooking process while the cooking appliance is performing the cooking process.

6. The method of claim 1, wherein the video or image plays on a continuous loop until the indication of the user selection of the particular selectable element is received.

7. The method of claim 1, wherein the video has a duration of between 2 and 10 seconds.

8. The method of claim 1, wherein the video or image depicts any of: cutting the food product, breaking the food product into pieces, stirring the food product, pouring the food product, manipulating the food product, or plating the food product.

9. The method of claim 1, wherein the video or image includes a textual and/or audio description of the food product.

10. The method of claim 1, wherein the plurality of selectable elements are overlaid on the video or image such that one or more of the plurality of selectable elements at least partially obscure display of the video or image.

11. The method of claim 1, wherein the plurality of selectable elements are arranged in a horizontal line across the GUI.

12. The method of claim 1, wherein each of the plurality of selectable elements displays an indication of a corresponding one of the plurality of temperature values.

13. The method of claim 1, further comprising:
in response to receiving an indication of an additional user interaction with the particular selectable element after selecting the particular selectable elements, dynamically adjusting the particular temperature corresponding to the particular selectable elements.

14. The method of claim 1, further comprising: in response to receiving the indication of the user selection of the particular selectable element of the plurality of selectable elements, generating the accelerated cooking program.

15. The method of claim 14, wherein generating the accelerated cooking program includes determining a cooking time based on the food product to achieve the particular temperature corresponding to the particular selectable element.

16. The method of claim 14, wherein generating the cooking program includes processing a parameter value indicative of the particular temperature using any of a cooking simulation model, a lookup table, or a food preparation algorithm to determine a cooking time to heat the food product to the particular temperature.

17. The method of claim 1, wherein the cooking appliance includes: a container for holding the food product during the cooking process;
a heating element; and
a controller device for causing the heating element to apply heat to at least a portion of the container to cook the food product to the particular temperature.

18. The method of claim 1, wherein the cooking appliance is a thermal immersion circulator configured to be placed in a container holding a quantity of liquid, the thermal immersion circulator comprising:
a circulator pump, the circulator pump including:
an inlet through which liquid from the container is received;
a heating element for heating the liquid received via the inlet;
an outlet through which the heated liquid is expelled back into the container;
one or more temperature sensors; and
a controller device configured to adjust a power output by the heating element to heat the liquid in the container based on instructions included in the accelerated cooking program and data from the one or more temperature sensors.

19. The method of claim 1, wherein the computer system operates as part of a food preparation guidance system that is communicatively coupled to the client computing device and the cooking appliance via the one or more computer networks.

20. The method according to claim 1, further comprising: determining a plurality of characteristics including at least two of: one or more food product characteristics, one or more fluid bath characteristics and one or more fluid bath and food product interaction characteristics, wherein the plurality of characteristics are determined based on time series data and a state of the cooking appliance; and
updating the accelerated cooking program based on the plurality of characteristics.

21. The method according to claim 20, wherein the one or more fluid bath characteristics includes at least one of a volume of the fluid, mass of the fluid, initial temperature of the fluid, thermal loss or gain of the fluid from an environment of the cooking appliance, thermal loss or gain of the fluid from the environment from radiation, thermal loss of the fluid to the environment from evaporation, or change in mass and volume of the fluid from evaporation.

22. The method according to claim 20, wherein the one or more food product characteristics include at least one of surface area of the food product, mass of the food product, volume of the food product, shape of the food product, initial temperature of the food product, or state of the food product.

23. The method according to claim 20, wherein the one or more fluid bath and food product interaction characteristics include an efficiency of the fluid bath to heat the food product as measured by a thermal heat transfer coefficient between the fluid and the food product, or a point in time when the food product was inserted into the fluid.

24. The method according to claim 20, further comprising: determining, based on the time series data and the plurality of characteristics, a projected period of time that the food product reaches the set-point temperature prior to reaching the set- point temperature, wherein the one or more projections displayed by the computer system in relation to the accelerated cooking process include the projected period of time that the food product reaches the set-point temperature.

25. The method according to claim 1, further comprising: receiving a selection of a desired cooking completion time indicative of a time by which a user desires the food product to be fully cooked; and
    causing a first notification to be displayed by the user computing device based at least in part on the received selection of the desired cooking completion time, the first notification instructs a user to turn on the cooking appliance.

\* \* \* \* \*